US010796577B2

(12) United States Patent
Katou et al.

(10) Patent No.: US 10,796,577 B2
(45) Date of Patent: Oct. 6, 2020

(54) SAFE OPERATION ASSISTANCE SYSTEM AND VEHICLE COLLISION PREVENTION METHOD

(71) Applicant: HITACHI CONSTRUCTION MACHINERY CO., LTD., Tokyo (JP)

(72) Inventors: Seiya Katou, Tokyo (JP); Hiroshi Watanabe, Tsuchiura (JP); Takeshi Ito, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 388 days.

(21) Appl. No.: 15/579,351

(22) PCT Filed: Jun. 13, 2016

(86) PCT No.: PCT/JP2016/067580
§ 371 (c)(1),
(2) Date: Dec. 4, 2017

(87) PCT Pub. No.: WO2016/199941
PCT Pub. Date: Dec. 15, 2016

(65) Prior Publication Data
US 2018/0151070 A1 May 31, 2018

(30) Foreign Application Priority Data
Jun. 12, 2015 (JP) .................................. 2015-119094

(51) Int. Cl.
*G08G 1/16* (2006.01)
*G08G 1/09* (2006.01)
(Continued)

(52) U.S. Cl.
CPC ............ *G08G 1/161* (2013.01); *B60R 21/00* (2013.01); *B60R 21/013* (2013.01); *G06Q 50/30* (2013.01);
(Continued)

(58) Field of Classification Search
CPC ......... G08G 1/161; G08G 1/16; B60R 21/013
See application file for complete search history.

(56) References Cited

U.S. PATENT DOCUMENTS 6,393,362 B1 5/2002 Burns
10,049,574 B2* 8/2018 Ohsugi .................. B60W 10/18
(Continued)

FOREIGN PATENT DOCUMENTS

CN 1813263 A 8/2006
JP 05-127747 A 5/1993
(Continued)

OTHER PUBLICATIONS

International Search Report of PCT/JP2016/067580 dated Sep. 13, 2016.
(Continued)

*Primary Examiner* — Thomas G Black
*Assistant Examiner* — Tarek Elarabi
(74) *Attorney, Agent, or Firm* — Mattingly & Malur, PC

(57) ABSTRACT

Onboard terminal device includes its own vehicle information acquisition section, a vehicle-to-vehicle communication section, and a collision risk determination section. The vehicle information acquisition section acquires the vehicle information including position information of an own vehicle. The vehicle-to-vehicle communication section performs wireless communications with another vehicle to communicate one's vehicle information to another vehicle and to receive the another vehicle's information, which includes position information of the another vehicle, from the another vehicle. The collision risk determination section determines a risk of collision between the one vehicle and the another vehicle by using a predetermined determination algorithm. The collision risk determination section sets priority of the one vehicle and priority of the another vehicle based on details of work, which the one vehicle and the another vehicle are performing, respectively, and changes the determination algorithm based on the priority of the one vehicle and the priority of the another vehicle.

4 Claims, 16 Drawing Sheets

(51) Int. Cl.
*H04W 4/44* (2018.01)
*G06Q 50/30* (2012.01)
*B60R 21/00* (2006.01)
*B60R 21/013* (2006.01)

(52) U.S. Cl.
CPC .............. *G08G 1/09* (2013.01); *G08G 1/16* (2013.01); *H04W 4/44* (2018.02)

(56) References Cited

U.S. PATENT DOCUMENTS

| | | | | |
|---|---|---|---|---|
| 2006/0092033 | A1* | 5/2006 | Hoff | E02F 9/20 |
| | | | | 340/679 |
| 2006/0142990 | A1 | 6/2006 | Vatchkov et al. | |
| 2006/0243056 | A1* | 11/2006 | Sundermeyer | G01N 3/32 |
| | | | | 73/760 |
| 2010/0010742 | A1* | 1/2010 | Mochizuki | G08G 1/161 |
| | | | | 701/301 |
| 2018/0148050 | A1* | 5/2018 | Katou | G08G 1/166 |

FOREIGN PATENT DOCUMENTS

| | | |
|---|---|---|
| JP | 2004-145386 A | 5/2004 |
| JP | 2004-164315 A | 6/2004 |
| WO | 2015/030240 A1 | 3/2015 |

OTHER PUBLICATIONS

Chinese Office Action received in corresponding Chinese Application No. 201680029520.2 dated Dec. 12, 2019.

\* cited by examiner

FIG. 4

| 401 | 402 | 403-1 | 403-2 | 403-3 | 405 | 406 | 407 | 408 | 409 | 410 | 411 |
|---|---|---|---|---|---|---|---|---|---|---|---|
| VEHICLE IDENTIFIER | VEHICLE TYPE | LATITUDE | LONGITUDE | ALTITUDE | VEHICLE SPEED | TRAVELING DIRECTION | VEHICLE DIRECTION | VEHICLE STATUS | FLEET MANAGEMENT STATUS | RECEPTION CLOCK TIME | WORK MODE |
| 110 (OWN VEHICLE) | DUMP TRUCK | 45.001 | 135.001 | 100.0 | 2.0 | 0 | 0 | 1 (LOADING) | HAULING TARGET :120 | 2015/01/01 11:22:32.0 | LOADING |
| 130 | LIGHT VEHICLE | 45.000 | 135.002 | 110.0 | 60.0 | 315 | 315 | 0 | | 2015/01/01 11:22:33.3 | OTHER |
| 120 | EXCAVATOR | 45.002 | 135.000 | 105.0 | 0.0 | 315 | 315 | 0 | OPERATING TARGET :110 | 2015/01/01 11:22:33.2 | LOADING |
| | | | | | 0 | 0 | 0 | | | | |
| | | | | | 0 | 0 | 0 | | | | |
| | | | | | 0 | 0 | 0 | | | | |

| 421<br>VEHICLE IDENTIFIER | 422<br>AVERAGE VEHICLE SPEED | 423<br>AVERAGE MOVEMENT RANGE | 424<br>WORK MODE |
|---|---|---|---|
| 110 (OWN VEHICLE) | 3km/h | 10m | LOADING |
| 130 | 60km/h | 300m | OTHER |
| 120 | 2km/h | 10m | LOADING |
| 0 | - | - | - |
| 0 | - | - | - |
| 0 | - | - | - |

| 441 VEHICLE TYPE | 442 WORK MODE | 443 PRIORITY |
|---|---|---|
| ALL | OTHER | 5 |
| EXCAVATOR | LOADING | 1 |
| WHEEL LOADER | LOADING | 1 |
| DUMP TRUCK | LOADING | 1 |
| DUMP TRUCK | WAITING | 2 |
| DUMP TRUCK | HAULING | 3 |
| DUMP TRUCK | DUMPING | 3 |
| BULLDOZER | LEVELING | 4 |
| GRADER | LEVELING | 4 |

212

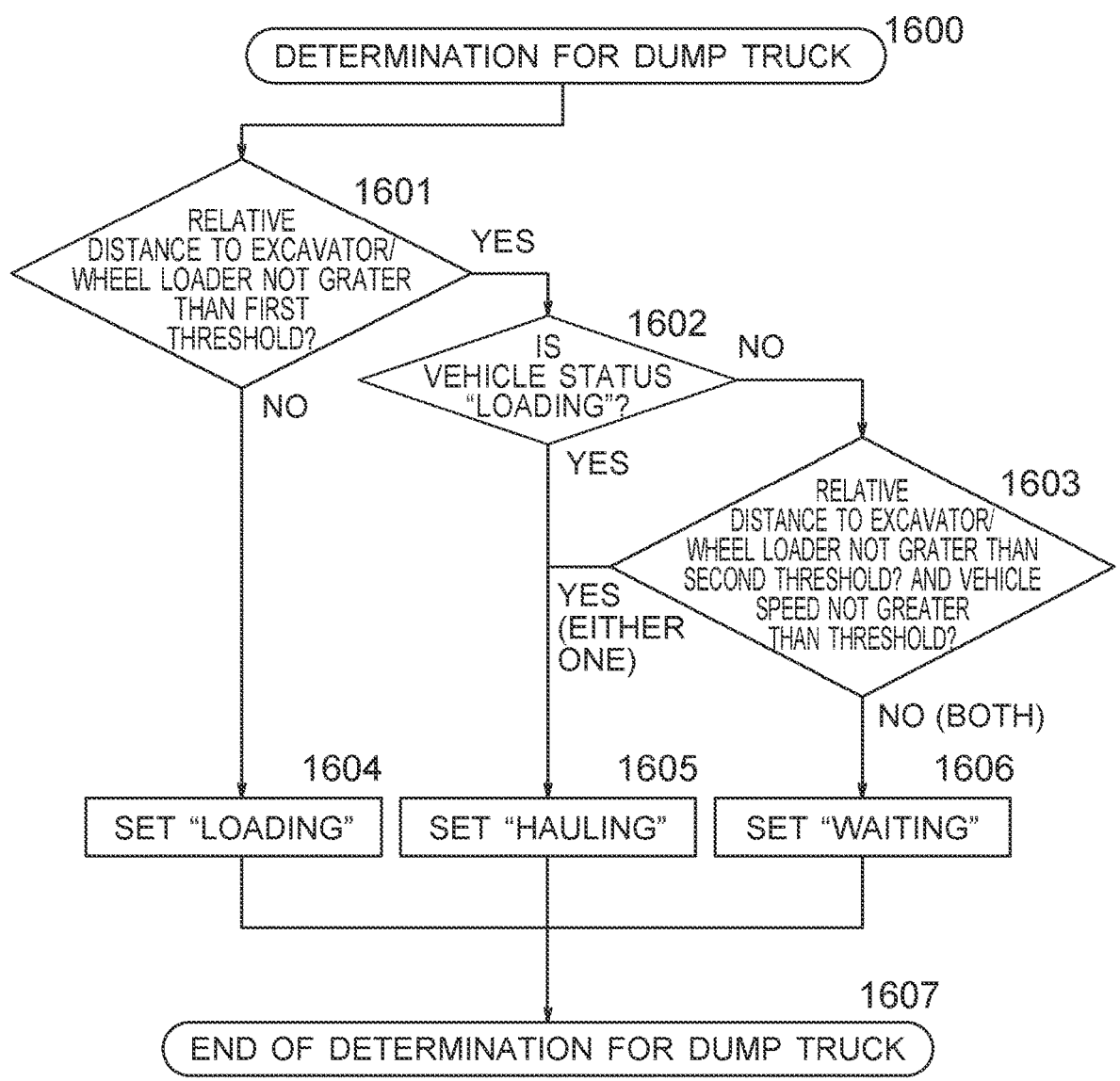

SAFE OPERATION ASSISTANCE SYSTEM AND VEHICLE COLLISION PREVENTION METHOD

TECHNICAL FIELD

This invention relates to onboard terminal device and a vehicle collision prevention method.

BACKGROUND ART

Generally, heavy work vehicles as dump trucks are used in a mine, at a construction site or the like. With these heavy work vehicles, the occurrence of a collision accident between vehicles themselves causes, in addition to direct injury or damage caused by the accident, serious problems in the performance of work due to an interruption of excavation work at the mine or construction work at the construction site. It is, therefore, important to ensure the prevention of collision accidents.

These heavy work vehicles, however, provide a wider blind spot to their operators than general automotive vehicles. Even if there is another vehicle that may potentially collide with an own vehicle, the operator of the own vehicle, therefore, would likely be unable to recognize the another vehicle, leading to a problem that a collision accident is prone to occur.

For the above-described problem, systems have been proposed to prevent a collision accident by complementing the operator's field of vision. For example, there is known a system that prevents a collision by detecting a forward obstacle with a sensor such as radar and generating a warning. Further, Patent Document 1 describes a system that acquires position information of another vehicle through wireless communication and upon detection of an approach to an own vehicle, generates a warning, thereby preventing a collision. Furthermore, Patent Document 2 describes to vary the shape and size of a safety area, which has been assigned to each vehicle for safety control, according to the position and speed of the vehicle.

PRIOR ART DOCUMENTS

Patent Documents

Patent Document 1: JP H05-127747 A
Patent Document 2: U.S. Pat. No. 6,393,362 B1

DISCLOSURE OF THE INVENTION

Problem to be Solved by the Invention

Upon making an attempt to prevent a collision accident between vehicles themselves in use in a mine, at a construction site, or the like, there is a need to reduce adverse effects on the overall productivity as best as possible. For example, upon making an attempt to avoid a collision between a dump truck that is moving to load or dump ore in a mine and another dump truck that is moving for the operator's rest, it is preferred for the avoidance of a collision to make a warning preferentially to the latter dump truck rather than the former dump truck. In this manner, a collision accident can be prevented without interfering with the movement of the former dump truck that is performing more important work for excavation work in the mine, thereby making it possible to avoid a reduction of the productivity of the entire mine. With the conventional technologies such as those described in Patent Document 1and Patent Document 2, however, such a warning cannot be made. Therefore, it has been unable to prevent a collision accident between vehicles themselves while reducing adverse effects on the overall productivity.

The present invention has been made in view of such a problem of the conventional technologies as described above. According to the present invention, it is possible to prevent a collision accident between vehicles themselves while reducing adverse effects on the overall productivity.

Means for Solving the Problem

Onboard terminal device according to the present invention includes an own vehicle information acquisition section that acquires own vehicle information including position information of an own vehicle, a vehicle-to-vehicle communication section that performs wireless communications with another vehicle to communicate the own vehicle information to the another vehicle and to receive another vehicle information, which includes position information of the another vehicle, from the another vehicle, and a collision risk determination section that determines a risk of collision between the own vehicle and the another vehicle by using a predetermined determination algorithm. The collision risk determination section sets priority of the own vehicle and priority of the another vehicle based on details of work, which the own vehicle and the another vehicle are performing, respectively, and changes the determination algorithm based on the priority of the own vehicle and the priority of the another vehicle.

A vehicle collision prevention method according to the present invention includes acquiring own vehicle information including position information of an own vehicle, performing wireless communications with another vehicle to communicate the own vehicle information to the another vehicle and to receive another vehicle information, which includes position information of the another vehicle, from the another vehicle, setting priority of the own vehicle and priority of the another vehicle based on details of work, which the own vehicle and the another vehicle are performing, respectively, changing a determination algorithm, which is for determining a risk of collision between the own vehicle and the another vehicle, based on the priority of the own vehicle and the priority of the another vehicle, and determining, with a computer, the risk of collision between the own vehicle and the another vehicle by using the changed determination algorithm, whereby a collision between the own vehicle and the another vehicle is prevented.

Advantageous Effects of the Invention

According to the present invention, it is possible to prevent a collision accident between vehicles themselves while reducing adverse effects on the overall productivity.

BRIEF DESCRIPTION OF THE DRAWINGS

FIG. 4 is a diagram showing a configuration example of a vehicle information management table.

FIG. 5 is a diagram showing a configuration example of a work mode management table.

FIG. 6 is a diagram showing a configuration example of a priority management table.

FIG. 16 is a flow chart of work mode determination for dump truck in the second embodiment of the present invention.

MODES FOR CARRYING OUT THE INVENTION

Embodiments of the present invention will hereinafter be described in detail with reference to the drawings.

First Embodiment

Figure 1:
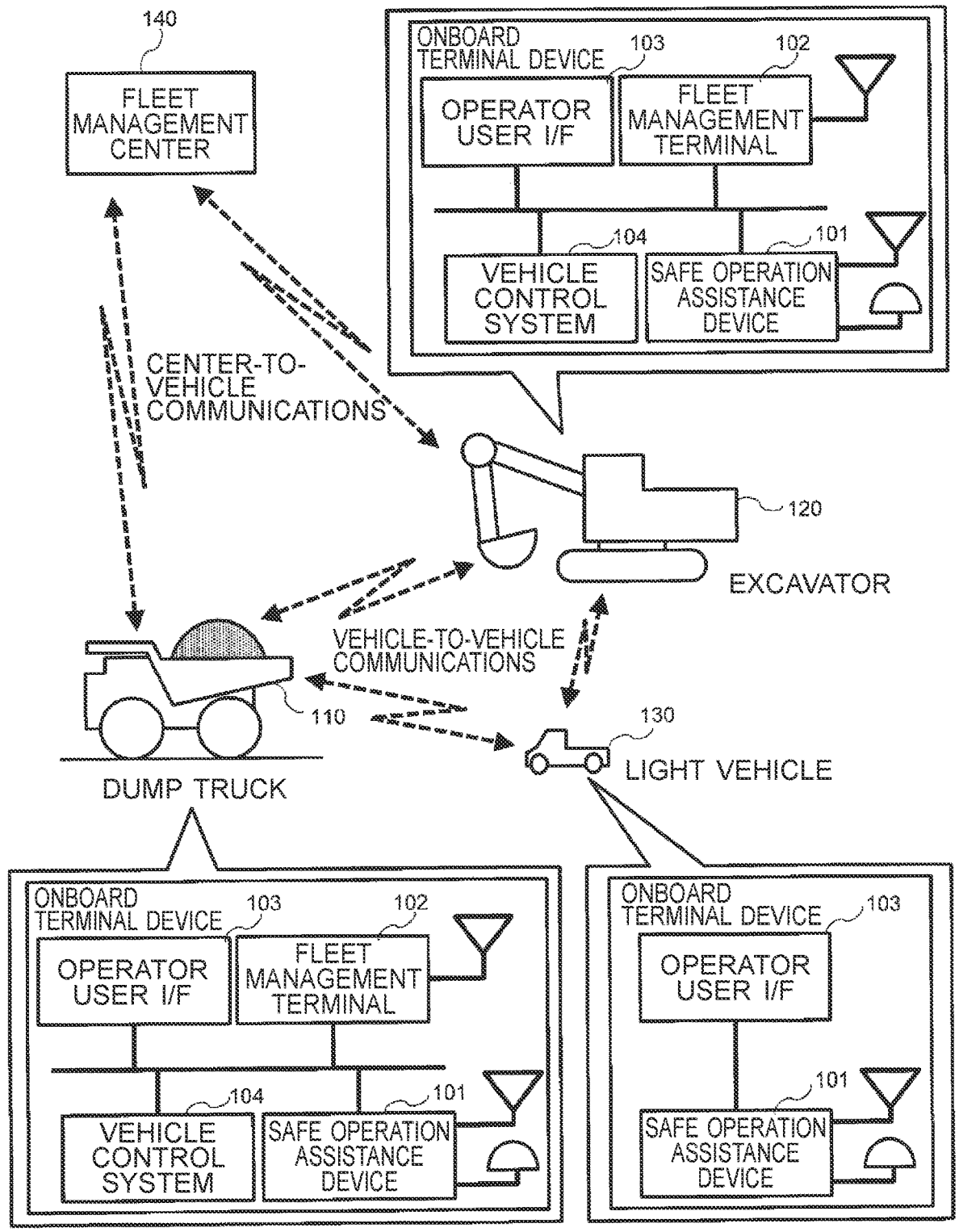
FIG. 1 is a diagram illustrating the configuration of a safe operation assistance system including safe operation assistance devices as application examples of onboard terminal device according to a first embodiment of the present invention.

FIG. 1 is a diagram illustrating the configuration of a safe operation assistance system, which includes safe operation assistance devices as application examples of onboard terminal device according to a first embodiment of the pre sent invention. The safe operation assistance system illustrated in FIG. 1 is configured of three sections of onboard terminal device mounted on vehicles 110,120,130, respectively, and a fleet management center 140.

The vehicles 110,120,130 are those which are used at a mine site or the like. The vehicles 110,120 are pieces of heavy work vehicles that are each subjected to fleet management by the fleet management center 140. Described specifically, the vehicle 110 is a dump truck, while the vehicle 120 is an excavator. On the other hand, the vehicle 130 is a light vehicle that is other than a heavy work vehicle and is not subjected to fleet management. FIG. 1 presents the illustrative safe operation assistance system with the three sections of onboard terminal device mounted on the three vehicles 110,120,130, respectively, but the safe operation assistance system according to this embodiment may include a smaller or greater number of onboard terminal device mounted on a like number of vehicles, respectively. Further, the safe operation assistance system according to this embodiment may include one or more vehicles other than those illustrated in FIG. 1, for example, one or more of wheel loaders, graders and the like.

The two onboard terminal device mounted on the vehicles 110,120, respectively, are each provided with a safe operation assistance device 101, a fleet management terminal 102, an operator user interface (I/F) 103, and a vehicle control system 104. On the other hand, the onboard terminal device mounted on the vehicle 130 is provided with a safe operation assistance device 101 and an operator user interface (I/F) 103, but is provided with neither the fleet management terminal 102 nor the vehicle control system 104. The individual devices incorporated in each onboard terminal device are connected one another via a network or individually. In the example of FIG. 1, the fleet management terminal 102 and the safe operation assistance device 101 are provided as discrete devices, but their functions may be combined together in a single device.

The safe operation assistance devices 101 mutually perform vehicle-to-vehicle wireless communications to communicate information on the vehicles on which they are mounted, respectively. In each of the two onboard terminal device mounted on the vehicles 110,120, respectively, the safe operation assistance device 101 acquires fleet management information on the status of fleet management of the own vehicle from the fleet management terminal 102, and also acquires control information on the status of control of the own vehicle from the connected vehicle control system 104. Based on these pieces of information, information on the other vehicle as acquired through vehicle-to-vehicle communications, and position information of the own vehicle, the safe operation assistance device 101 determines the risk of a collision with the other vehicle. If it is determined as a result that there is a risk of collision with the other vehicle, a warning is outputted to the operators of the vehicles 110,120 via the operator user I/Fs 103, respectively, and a control command is outputted to the vehicle control systems 104 for the avoidance of a collision.

On the other hand, the onboard terminal device mounted on the vehicle 130 is provided with neither the fleet management terminal 102 nor the vehicle control system 104, so that neither fleet management information nor control information on the own vehicle can be acquired. Accordingly, the safe operation assistance device 101 determines the risk of a collision with each of the remaining two vehicles (which may hereinafter be called "another vehicle") based on information on the another vehicle as acquired through vehicle-to-vehicle communications and position information of the own vehicle. If it is determined as a result that there is a risk of collision with the another vehicle, a warning is outputted to the operators of the vehicles 110,120 via the operator user I/Fs 103, respectively. On the vehicle 130 which is not subjected to fleet management at the fleet management center 140, only the safe operation assistance device 101 may be mounted as the onboard terminal device. In this case, the safe operation assistance device 101 may be configured to have only a function to transmit information of the own vehicle to the remaining two vehicles, and to perform neither the determination of the risk of a collision with the another vehicle nor the warning to the operators of the own vehicle and another vehicle.

The fleet management terminal 102 performs wireless communications with the fleet management center 140 to notify the details of work by the own vehicle at preset intervals to the fleet management center 140 and also to receive work instructions communicated from the fleet management center 140. Further, the fleet management terminal 102 internally stores fleet management information on the status of fleet management of the own vehicle, and outputs this fleet management information to the connected safe operation assistance device 101.

Based on warning information outputted from each safe operation assistance device 101, the connected operator user I/F 103 makes a warning about another vehicle, which has a risk of collision with the own vehicle, to the operator of the own vehicle. The operator user I/F 103 can make the warning to the another vehicle, for example, by ringing a buzzer, turning on a lamp, or displaying a warning screen.

Each vehicle control system 104 outputs information on the status of the own vehicle to the connected safe operation assistance device 101. Upon receipt of a collision-avoiding control signal from the safe operation assistance device 101, the vehicle control system 104 controls braking, steering and the like of the own vehicle based on the control signal to perform traveling control for the avoidance of a collision.

Figure 2:
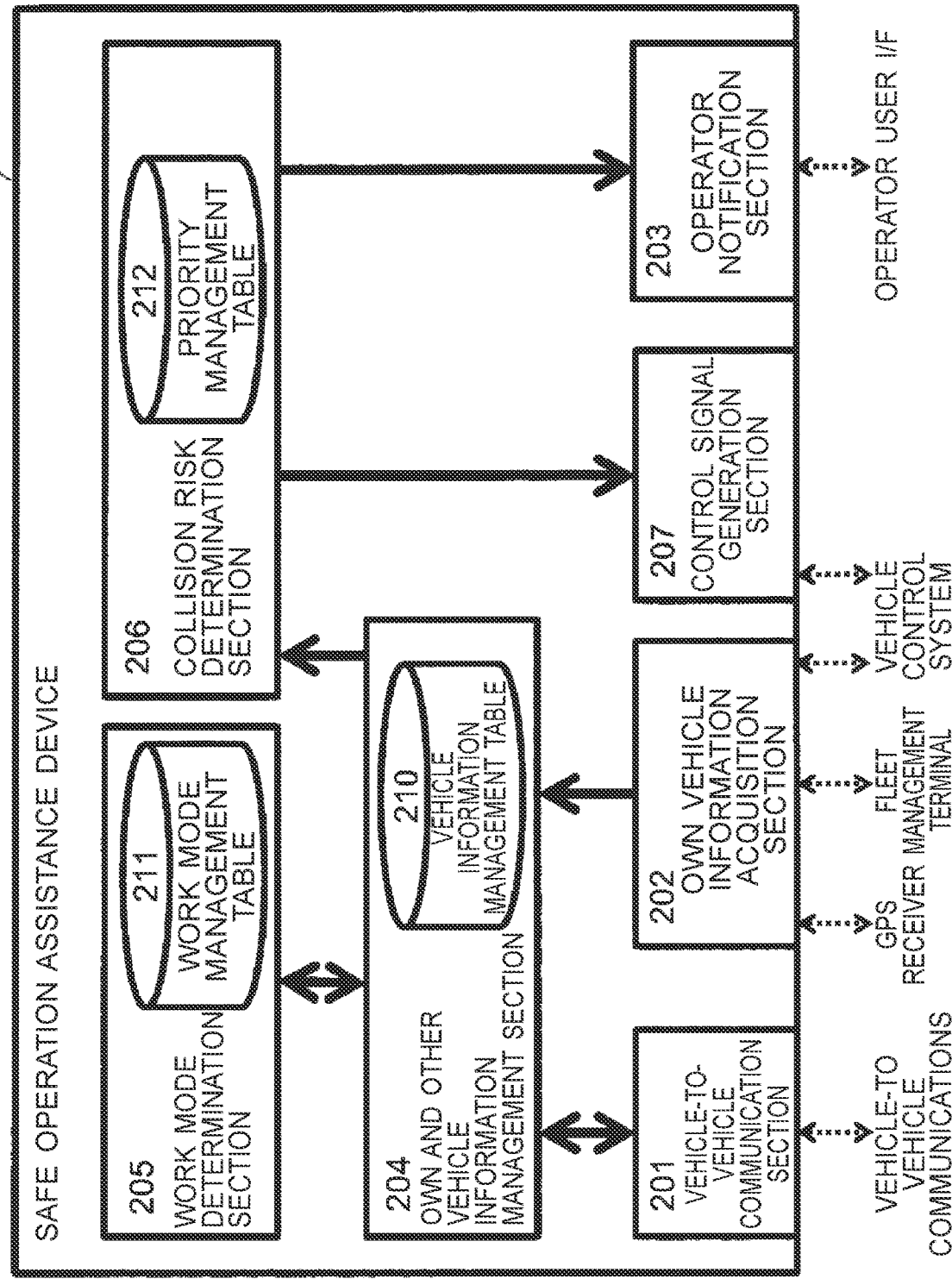
FIG. 2 is a diagram depicting the configuration of each safe operation assistance device.

FIG. 2 is a diagram depicting the configuration of each safe operation assistance device 101. The safe operation assistance device 101 is provided with a vehicle-to-vehicle communication section 201, an own vehicle information acquisition section 202, an operator notification section 203, an own and other vehicle information management section 204, a work mode determination section 205, a collision risk determination section 206, and a control signal generation section 207.

The vehicle-to-vehicle communication section 201 has a function to perform, with the remaining two vehicles, vehicle-to-vehicle communications as direct wireless communications without going through any relay station. Through the wireless communications, the vehicle-to-vehicle communication section 201 communicates information on the own vehicle (hereinafter called "the own vehicle information") to the remaining two vehicles (which may hereinafter be called "other vehicles"), and also receives information on the other vehicles (hereinafter called "the other vehicle information") from the other vehicles.

The own vehicle information acquisition section 202 acquires the own vehicle information, and outputs the data to the own and other vehicle information management section 204. The own vehicle information, which the own vehicle information acquisition section 202 acquires, includes position information of the own vehicle as outputted from a device for capturing the position of the own vehicle, for example, a global positioning system (GPS) receiver. In the safe operation assistance device 101 in the onboard terminal device mounted on each of the vehicles 110,120, the information on the status of the own vehicle as outputted from the connected vehicle control system 104 in FIG. 1, the fleet management information on the own vehicle as outputted from the connected fleet management terminal 102 in FIG. 1, and the like can be included in the own vehicle information that the own vehicle information acquisition section 202 acquires. For example, in the case of the safe operation assistance device 101 in the onboard terminal device mounted on the vehicle 110 as the dump truck, information such as "hauling", "loading" or "dumping" is acquired as fleet management information on the own vehicle. As information on the status of the own vehicle, on the other hand, information such as "loaded" or "unloaded" is acquired based on pressure information of suspensions.

The own and other vehicle information management section 204 has a vehicle information management table 210, and the own vehicle information acquired at the own vehicle information acquisition section 202 is stored and managed in this vehicle information management table 210.

The own vehicle information stored in the vehicle information management table 210 is outputted from the own and other vehicle information management section 204 to the vehicle-to-vehicle communication section 201, and is transmitted from the vehicle-to-vehicle communication section 201 to the other vehicles. On the other hand, the other vehicle information received at the vehicle-to-vehicle communication section 201 is outputted from the vehicle-to-vehicle communication section 201 to the own and other vehicle information management section 204. The own and other vehicle information management section 204 stores and manages the other vehicle information in the vehicle information management table 210. Further, the own vehicle information and another vehicle information stored in the vehicle information management table 210 are outputted, as needed, from the own and other vehicle information management section 204 to the work mode determination section 205 and collision risk determination section 206.

Based on the own vehicle information and other vehicle information outputted from the own and other vehicle information management section 204, the work mode determination section 205 estimates the details of work that the own vehicle and the other vehicles are performing, respectively, and determines the work modes corresponding to the details of the work. The work mode determination section 205 has a work mode management table 211, and stores and manages the determination results of the work modes of the respective vehicles in this work mode management table 211. The determination results of the work modes of the respective vehicles, which are stored in the work mode management table 211, are outputted from the work mode determination section 205 to the own and other vehicle information management section 204, and are used for the renewal of the own vehicle information and other vehicle information stored in the vehicle information management table 210. The determination histories of past work modes of the respective vehicles may be stored beforehand in the work mode management table 211, and may be used for the determination of current work modes.

The collision risk determination section 206 has a priority management table 212, in which information on priorities set for every work modes with respect to various vehicles is stored. Based on the own vehicle information and other vehicle information outputted from the own and other vehicle information management section 204, the collision risk determination section 206 determines the risk of a collision between the own vehicle and the other vehicle. If the relative distance of one of the other vehicles to the own vehicle has decreased to or less than a preset distance, for example, the collision risk determination section 206 determines that there is a risk of collision. If it is determined as a result that there is a risk of collision, the collision risk determination section 206 notifies the determination result to the operator notification section 203 and control signal generation section 207. In the above-described determination for a risk of collision, the collision risk determination section 206 determines the respective priorities of the own vehicle and other vehicles based on the information on priorities stored in the priority management table 212. The priority of the own vehicle and those of the other vehicles are compared with each other, and based on the results of the comparison; the risk determination algorithm is changed. In this respect, a detailed description will be made subsequently herein.

Based on the notification from the collision risk determination section 206, the operator notification section 203 outputs warning information on another vehicle, which has been determined to have a risk of collision with the own vehicle, to the operator user I/F 103 in FIG. 1. Responsive to the warning information, the operator user I/F 103 makes a warning to the operator of the own vehicle.

Based on the notification from the collision risk determination section 206, the control signal generation section 207 generates control signals for performing traveling control of the own vehicle, and outputs them to the vehicle control system 104 in FIG. 1. Responsive to these control signals, the vehicle control system 104 performs traveling control of the own vehicle to avoid a collision with the another vehicle.

In each safe operation assistance device 101, the own vehicle information acquisition section 202, operator notification section 203, own and other vehicle information management section 204, work mode determination section 205, collision risk determination section 206, and control signal generation section 207, all of which have been described above, may each be realized using processing by a computer configured of a central processing unit (CPU), a random access memory (RAM), a read only memory (ROM) and the like. Further, the vehicle information management table 210, work mode management table 211 and priority management table 212 can be realized using storage devices such as a hard disk drive (HDD) or a flash memory.

Further, either the operator notification section 203 or the control signal generation section 207 may be omitted from the safe operation assistance device 101. In the case of the safe operation assistance device 101 in the onboard terminal device mounted on the vehicle 130 in FIG. 1, for example, the vehicle control system 104 as an output destination of control signals is not connected so that the control signal generation section 207 is not needed.

Figure 3A:
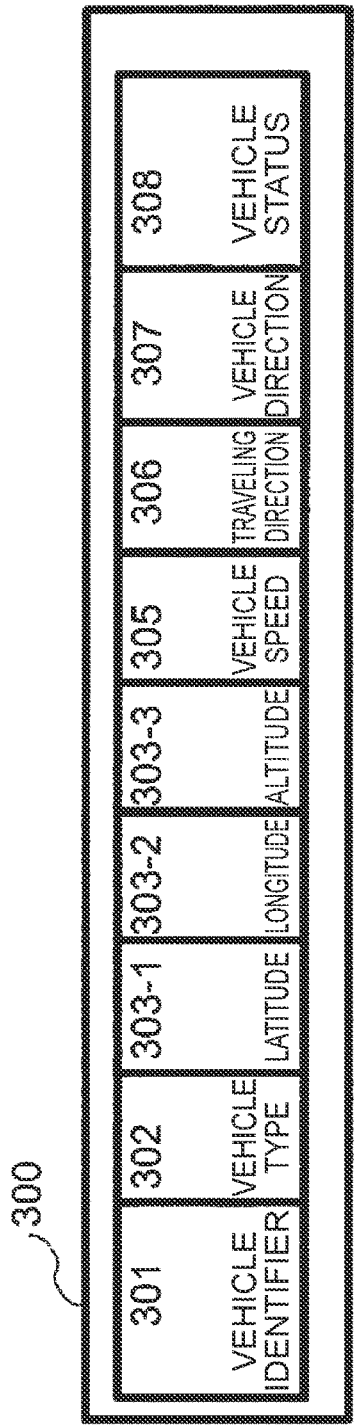
FIGS. 3A and 3B are diagrams showing data format examples of vehicle-to-vehicle communication information.
Figure 3B:
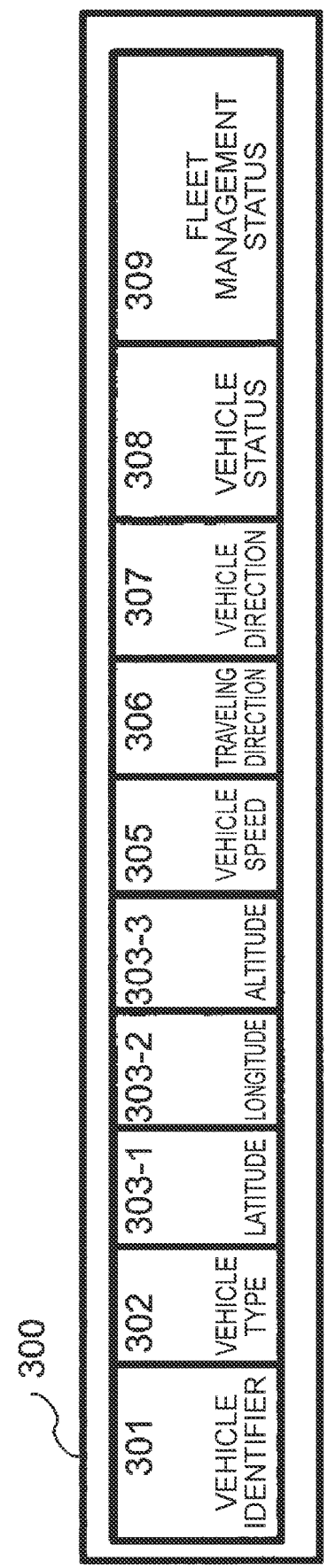

FIGS. 3A and 3B are diagrams showing data format examples of vehicle-to-vehicle communication information 300 communicated at the vehicle-to-vehicle communication section 201 in each safe operation assistance devices 101, respectively.

FIG. 3A shows the format example of the vehicle-to-vehicle communication information 300 communicated from the safe operation assistance device 101 mounted on the vehicle on which the fleet management terminal 102 is not mounted, that is, the vehicle 130 as a light vehicle in FIG. 1. As shown in FIG. 3A, the vehicle-to-vehicle communication information 300 in this case is configured from a vehicle identifier 301, a vehicle type 302, a latitude 303-1, a longitude 303-2, an altitude 303-3, a vehicle speed 305, an traveling direction 306, a vehicle direction 307, and a vehicle status 308.

The vehicle identifier 301 is an identifier for uniquely identifying a vehicle as a transmission source. For individual vehicles for use at amine site, identifier values which do not overlap one another are set be forehand to identify them uniquely. As the vehicle identifier 301, there is set the value of the identifier of the vehicle on which the safe operation assistance device 101, which communicated the vehicle-to-vehicle communication information 300, is mounted.

The vehicle type 302 is an identifier for identifying the type of the vehicle as a transmission source. As the vehicle type 302, there is set a value corresponding to the type of each vehicle such as, for example, a dump truck, an excavator, a wheel loader, a grader, a bulldozer, or a light vehicle.

The latitude 303-1, longitude 303-2 and altitude 303-3 are information that indicates the position of the vehicle as a transmission source. As the latitude 303-1, longitude 303-2 and altitude 303-3, the latitude, longitude and altitude corresponding to the position of the own vehicle in the mine are set based on the position information of the vehicle as acquired at the own vehicle information acquisition section 202. In the examples of FIGS. 3A and 3B, the position of the vehicle as a transmission source is represented by the latitude 303-1, longitude 303-2 and altitude 303-3.

The vehicle speed 305 is information that indicates the speed of the vehicle as a transmission source. The speed of the vehicle as a transmission source can be determined, for example, based on a position change amount that is determined from the position information of the own vehicle as acquired at the own vehicle information acquisition section 202.

The traveling direction 306 is information that indicates the traveling direction of the vehicle as a transmission source. The traveling direction of the vehicle as a transmission source can be determined, for example, based on a position change direction that is determined from the position information of the own vehicle as acquired at the own vehicle information acquisition section 202.

The vehicle direction 307 is information that indicates the direction of the vehicle as a transmission source. When the vehicle is moving straight ahead, for example, the traveling direction 306 and the vehicle direction 307 take the same value. When the vehicle is moving backward, on the other hand, the difference between the value of the traveling direction 306 and that of the vehicle direction 307 becomes 180 degrees, thereby indicating directions opposite to each other.

The vehicle status 308 is information that indicates the status of the vehicle as a transmission source. The details of the status of the vehicle as represented by this vehicle status 308 are set beforehand for every type of vehicle as indicated by the vehicle type 302. If the vehicle as a transmission source is a dump truck, for example, a value corresponding to its loading state is set as the vehicle status 308. If the vehicle as a transmission source is a light vehicle, on the other hand, a constant initial value is set as the vehicle status 308 irrespective of the status of the vehicle.

FIG. 3M shows the format example of the vehicle-to-vehicle communication information 300 communicated from the safe operation assistance device 101 mounted on each vehicle on which the fleet management terminal 102 is mounted, that is, each of the vehicles 110,120 in FIG. 1, which is a heavy work vehicle such as a dump truck or an excavator. As shown in FIG. 3B, the vehicle-to-vehicle communication information 300 in this case is configured further from a fleet management status 309 in addition to the individual information of the same vehicle identifier 301, vehicle type 302, latitude 303-1, longitude 303-2, altitude 303-3, vehicle speed 305, traveling direction 306, vehicle direction 307 and vehicle status 308 as in FIG. 3A.

The fleet management status 309 is information that indicates the status of fleet management of the vehicle as a transmission source. The details of the status of fleet management as represented by this fleet management status 309 are set beforehand for each type of vehicle as indicated by the vehicle type 302, and is determined based on the fleet management information outputted from the fleet management terminal 102. If the vehicle as a transmission source is an excavator or wheel loader, for example, a value that represents whether the vehicle is operating, the vehicle identifier of a dump truck as a loading destination when ore or the like is to be loaded, or the like is set as the fleet management status 309. If the vehicle as a transmission source is, for example, a dump truck, on the other hand, a value corresponding to the details of work such as "hauling", "loading" or "dumping", the vehicle identifier of the excavator or wheel loader as a target vehicle in loading work, path information during haulage, and/or the like are set as the fleet management status 309.

FIG. 4 is a diagram showing a configuration example of the vehicle information management table 210. As shown in FIG. 4, individual data of a vehicle identifier 401, a vehicle type 402, a latitude 403-1, a longitude 403-2, an altitude 403-3, a vehicle speed 405, an traveling direction 406, a vehicle direction 407, a vehicle status 408, a fleet management status 409, a reception clock time 410 and a work mode 411 are stored in every row corresponding to each vehicle in the vehicle information management table 210. In FIG. 4, the data in row 1 represent information on the own vehicle, and the data in row 2 onwards represent information on other vehicles.

The vehicle identifier 401 is an identifier for uniquely identifying each vehicle, data of which are managed in the vehicle information management table 210. As mentioned above, to individual vehicles for use at a mine site, identifier values which do not overlap one another are set beforehand to identify them uniquely. In the case of the own vehicle information, a value set beforehand as an identifier for the own vehicle is stored as a vehicle identifier 401. In the case of the other vehicle information, the values set as vehicle identifiers 301 in the vehicle-to-vehicle communication information 300 of FIG. 3A or 3B as received at the vehicle-to-vehicle communication section 201 are stored as the vehicle identifiers 401.

The vehicle type 402 is an identifier for identifying the type of each vehicle, the data of which is managed in the vehicle information management table 210. In the case of the own vehicle information, details set beforehand corresponding to the type of the own vehicle are stored as a vehicle type 402. In the case of the other vehicle information, the details set as the vehicle types 302 in the vehicle-to-vehicle communication information 300 of FIG. 3A or 3B as received at the vehicle-to-vehicle communication section 201 are stored as vehicle types 402.

The latitude 403-1, longitude 403-2 and altitude 403-3 are data that indicate the position of each vehicle. The data are managed in the vehicle information management table 210. In the case of the own vehicle information, the values corresponding to the position information of the own vehicle as acquired at the own vehicle information acquisition section 202 are stored as a latitude 403-1, longitude 403-2 and altitude 403-3, respectively. In the case of the other vehicle information, the values set as the latitudes 303-1, longitudes 303-2 and altitudes 303-3 in the vehicle-to-vehicle communication information 300 of FIG. 3A or 3B as received at the vehicle-to-vehicle communication section 201 are stored as latitudes 403-1, longitudes 403-2 and altitudes 403-3, respectively.

The vehicle speed 405 is a piece of data, which indicates the speed of each vehicle and is managed in the vehicle information management table 210. In the case of the own vehicle information, based on a position change amount, which is determined from the position information of the own vehicle as acquired at the own vehicle information acquisition section 202, and the above-mentioned vehicle speed pulse information, the speed of the own vehicle is determined, and its value is stored as a vehicle speed 405. In the case of the other vehicle information, the values set as the vehicle speeds 305 in the vehicle-to-vehicle communication information 300 of FIG. 3A or 3B as received at the vehicle-to-vehicle communication section 201 are stored the vehicle speeds 405.

The traveling direction 406 is a piece of data, which indicates the traveling direction of each vehicle and is managed in the vehicle information management table 210. In the example of FIG. 4, the traveling direction of each vehicle is represented in terms of an angle from a reference direction under the assumption that the true north direction is the reference direction and the clockwise direction is positive. In the case of the own vehicle information, based on the position change direction, which is determined from the position information acquired at the own vehicle information acquisition section 202, and the above-mentioned angular velocity information, the traveling direction of the own vehicle is determined and its value is stored as an traveling direction 406. In the case of the other vehicle information, the values set as traveling directions 306 in the vehicle-to-vehicle communication information 300 of FIG. 3A or 3B as received at the vehicle-to-vehicle communication section 201 a restored as traveling directions 406.

The vehicle direction 407 is apiece of data, which indicates the direction of each vehicle and is managed in the vehicle information management table 210. In the example of FIG. 4, the direction of each vehicle is, like the traveling direction 406, represented in terms of an angle from the reference direction under the assumption that the true north direction is the reference direction and the clockwise direction is positive. In the case of the own vehicle information, based on the position change direction, which is determined from the position information acquired at the own vehicle information acquisition section 202, and the above-mentioned angular velocity information, the direction of the own vehicle relative to its traveling direction is determined. From its value, the direction of the own vehicle relative to the above-described reference direction is determined, and its value is stored as a vehicle direction 407. In the case of the other vehicle information, the values set as vehicle directions 307 in the vehicle-to-vehicle communication information 300 of FIG. 3A or 3B as received at the vehicle-to-vehicle communication section 201 are stored as vehicle directions 407.

The vehicle status 408 is a piece of data, which indicates the status of each vehicle and is managed in the vehicle information management table 210. The details of the status of the vehicle as represented by this vehicle status 408 are, like the vehicle status 308 in FIG. 3M or 3M, set beforehand for every type of vehicle as indicated by the vehicle type 402. In the example of FIG. 4, either "0" that indicates "unloaded" or "1" that indicates "loaded" is stored as a vehicle status 408 if the vehicle type 402 is "dump truck". The term "loaded" means a status that ore or rock has been loaded on the vessel of the dump truck. If the vehicle type 402 is other than a dump truck, on the other hand, "0" is stored as a vehicle status 408 all the time. In the case of the own vehicle information, if the own vehicle is a dump truck, as disclosed in JP 5160468 BE, for example, it is determined based on a load weight calculated with pressure sensors whether the dump truck is loaded, and a value corresponding to the determination result is stored as a vehicle status 408. If the own vehicle is not a dump truck, on the other hand, a preset value is stored as a vehicle status 408. In the case of the other vehicle information, the values set as vehicle statuses 308 in the vehicle-to-vehicle communication information 300 of FIG. 3M or 3M as received at the vehicle-to-vehicle communication section 201 are stored as the vehicle statuses 408.

The fleet management status 409 is a piece of data, which indicates the status of fleet management of each vehicle and is managed in the vehicle information management table 210. The details of the status of fleet management as represented by this fleet management status 409 are set beforehand for each type of vehicle as indicated by the vehicle type 402, and is determined based on the fleet management information outputted from the fleet management terminal 102. In the example of FIG. 4, if the vehicle type is a dump truck, the details of work such as "hauling", "loading" or "dumping" and, when an excavator or wheel loader as a target vehicle in loading work exists, the vehicle identifier corresponding to the target vehicle are stored as fleet management status 409. In addition, path information or the like during haulage is also stored as fleet management status 409. If the vehicle type 402 is an excavator or wheel loader, on the other hand, the state of operation such as "operating" or "not operating" and, if a dump truck as a target vehicle which is a loading destination of ore or the like exists, a vehicle identifier corresponding to the target vehicle are stored as fleet management status 409. In the case of the own vehicle information, a value based on the fleet management information outputted from the fleet management terminal 102 is stored as fleet management status 409. In the case of the other vehicle information, the values set as fleet management statuses 309 in the vehicle-to-vehicle communication information 300 of FIG. 3M or 3M as received at the vehicle-to-vehicle communication section 201 are stored as fleet management statuses 409. If concerning the own vehicle information, no fleet management information is available from the fleet management terminal 102 or if concerning the other vehicle information, fleet management statuses 309 are not included in the received vehicle-to-vehicle communication information 300 as in FIG. 3A, "NULL", which represents that no fleet management is performed, is stored as a fleet management status 409.

The reception clock time 410 is a piece of data, which indicates the clock time of data generation for each vehicle in the vehicle information management table 210. In the case of the own vehicle information, the clock time, at which the position information of the own vehicle was inputted last time from the own vehicle information acquisition section 202, is stored as a reception clock time 410. In the case of the other vehicle information, the clock times, at which the vehicle-to-vehicle communication information 300 is received last time at the vehicle-to-vehicle communication sections 201, are stored as reception clock times 410. If the input of position information of the own vehicle has ceased for a preset time or longer or if the reception of the vehicle-to-vehicle communication information 300 has ceased for a preset time or longer, the individual pieces of data of the own vehicle information about the vehicle or the other vehicle information as stored in the vehicle information management table 210 are all deleted (reset).

The work mode 411 is a piece of data, which indicates the work that each vehicle is performing and is managed in the vehicle information management table 210. The details of the work represented by the work mode 411 have been set beforehand for every type of vehicle indicated by the vehicle type 402, and are determined based on the determination result of the work mode as outputted from the work mode determination section 205. In the example of FIG. 4, if the vehicle type 402 is a dump truck, work details such as "loading", "waiting", "hauling", "dumping" or "other" are stored as a work mode 411. If the vehicle type 402 is an excavator or wheel loader, work details such as "loading" or "other" are stored as a work mode 411. If the vehicle type 402 is a bulldozer or grader, work details such as "leveling" or "other" are stored as a work mode 411. If the vehicle type 402 is other than these vehicles, "other" is stored as the work mode 411. In the case of each of the own vehicle information and the other vehicle information, work details corresponding to the determination result of the work mode by the work mode determination section 205 are stored as a work mode 411. If the own vehicle information or the other vehicle information about a vehicle is set for the first time in the vehicle information management table 210 and the determination result of the work mode for the vehicle has not been obtained yet, "other" as initial work details is stored as a work mode 411.

In the example of the vehicle information management table 210 shown in FIG. 4, the value of the vehicle identifier 401 and the type as the vehicle type 402 in the own vehicle information as stored in row 1 are "110" and "dump truck", respectively. Further, the values of the vehicle identifier 401 and the types as the vehicle type 402 in the other vehicle information as stored in row 2 and row 3, respectively, are "130" and "120", and "light vehicle" and "excavator". FIG. 4 represents an example of the vehicle information management table 210 in the safe operation assistance device 101 mounted on the vehicle 110 as the dump truck as illustrated in the system configuration example of FIG. 1. Furthermore, there are another vehicle 120 as the excavator and a further vehicle 130 as the light vehicle, both around the own vehicle 110. FIG. 4 represents that the vehicle information of these vehicles is managed in the vehicle information management table 210.

FIG. 5 is a diagram showing a configuration example of the work mode management table 211. As shown in FIG. 5, individual data of a vehicle identifier 421, an average vehicle speed 422, an average movement range 423 and a work mode 424 are stored in every row corresponding to each vehicle in the work mode management table 211. In FIG. 5, the data in row 1 represent information on the work mode of the own vehicle, and the data in row 2 onwards represent information on the work modes of the other vehicles.

The vehicle identifier 421 is an identifier for uniquely identifying each vehicle, data of which are managed in the work mode management table 211. As mentioned above, for individual vehicles for use at a mine site, identifier values which do not overlap one another are set beforehand to identify them uniquely. In the case of information on the work mode of the own vehicle, a value set beforehand as an identifier for the own vehicle is stored as a vehicle identifier 421. In the case of information on the work modes of the other vehicles, the same values as the vehicle identifiers 401 set in the other vehicle information of the other vehicles as managed in the vehicle information management table 210 are stored as vehicle identifiers 421.

The average vehicle speed 422 is a piece of data, which indicates an average vehicle speed in a preset period of time of each vehicle and is managed in the work mode management table 211. By latching, for example, the history of past values of the vehicle speed 405 as set in the vehicle information management table 210 for every vehicle and separately from the work mode management table 211, the value of the average vehicle speed 422 can be calculated based on the history. Preferably, the value of the average vehicle speed 422 may be renewed whenever the work mode determination section 205 performs the determination of the work mode of the vehicle.

The average movement range 423 is a piece of data, which indicates the size of an average movement range in a preset period of time of each vehicle and is managed in the work mode management table 211. By latching, for example, the history of past values of the latitude 403-1, longitude 403-2 and altitude 403-3 as set in the vehicle information management table 210 for every vehicle and separately from the work mode management table 211, the value of the average movement range 423 can be calculated based on the history. Preferably, the value of the average movement range 423 may be renewed whenever the work mode determination section 205 performs the determination of the work mode of the vehicle.

The work mode 424 is a piece of data, which indicates the determination result of the work mode of each vehicle and is managed in the work mode management table 211. The details of the work mode 424 are set based on the determination result of the work mode by the work mode determination section 205, and by determination of the work mode of the vehicle at the work mode determination section 205, are renewed to the latest work details. The details of the work mode 424 are also reflected to those of the work mode 411 of the corresponding vehicle in the vehicle information management table 210 of FIG. 4, so that each vehicle has the same work details in both the tables.

After the determination of work modes by the work mode determination section 205, the vehicles subjected to data management in the vehicle information management table 210 of FIG. 4 and the vehicles subjected to data management in the work mode management table 211 of FIG. 5 conform with each other, respectively. Described specifically, the values of the vehicle identifier 401 in the respective rows of the vehicle information management table 210 and the values of the vehicle identifier 421 in the corresponding respective rows of the work mode management table 211 become identical to each other, respectively. Further, if any piece of data in the own vehicle information or other vehicle information on any vehicle in the vehicle information management table 210 is deleted (reset) as mentioned above, the corresponding piece of data on the vehicle is also deleted (reset) likewise in the work mode management table 211.

FIG. 6 is a diagram showing a configuration example of a priority management table 212. As shown in FIG. 6, the priority management table 212 is configured of respective data of a vehicle type 441, a work mode 442 and a priority 443. In the priority management table 212, row 1 presents a default value of priority, and in row 2 onwards, for every combinations of the vehicle type 441 and the work mode 442, values of the priority 443 to be used in the determination of a risk of collision are set.

The vehicle type 441 is a piece of data, that indicates the type of each vehicle the priority of which is managed in the priority management table 212. As the vehicle type 441, the types of various vehicles which can be set as the vehicle type 402 in the vehicle information management table 210, for example, "excavator", "wheel loader", "dump truck", "bulldozer", "grader" and the like can be set.

The work mode 442 is apiece of data, that indicates the work details of each vehicle the priority of which is managed in the priority management table 212. As the work mode 442, the details of various work which can be set as the work mode 411 in the vehicle information management table 210 or the work mode 424 in the work mode management table 211 can be set.

The priority 443 is a piece of data, which indicates a value of priority corresponding to the combination of a vehicle type and a work mode set as the vehicle type 441 and the work mode 442, respectively. The smaller the value set as the priority 443, the higher the priority level in the determination of a risk of collision.

By using a priority management table like the priority management table 212 of FIG. 6, the collision risk determination section 206 can set the priorities of the own vehicle and other vehicles upon determination of a risk of collision for every combination of vehicle type and work mode based on the modes of work that the own vehicle and the other vehicles are performing, respectively. In the example of FIG. 6, for example, if the vehicle type 441 is "excavator" and the work mode 442 is "loading", the value of the priority 443 is "1". If the vehicle type 441 is "dump truck" and the work mode 442 is "hauling", on the other hand, the value of the priority 443 is "3". It is, therefore, understood that the excavator, which is performing loading work, is higher in priority level in the determination of a risk of collision than the dump truck which is performing loading work.

Figure 7:
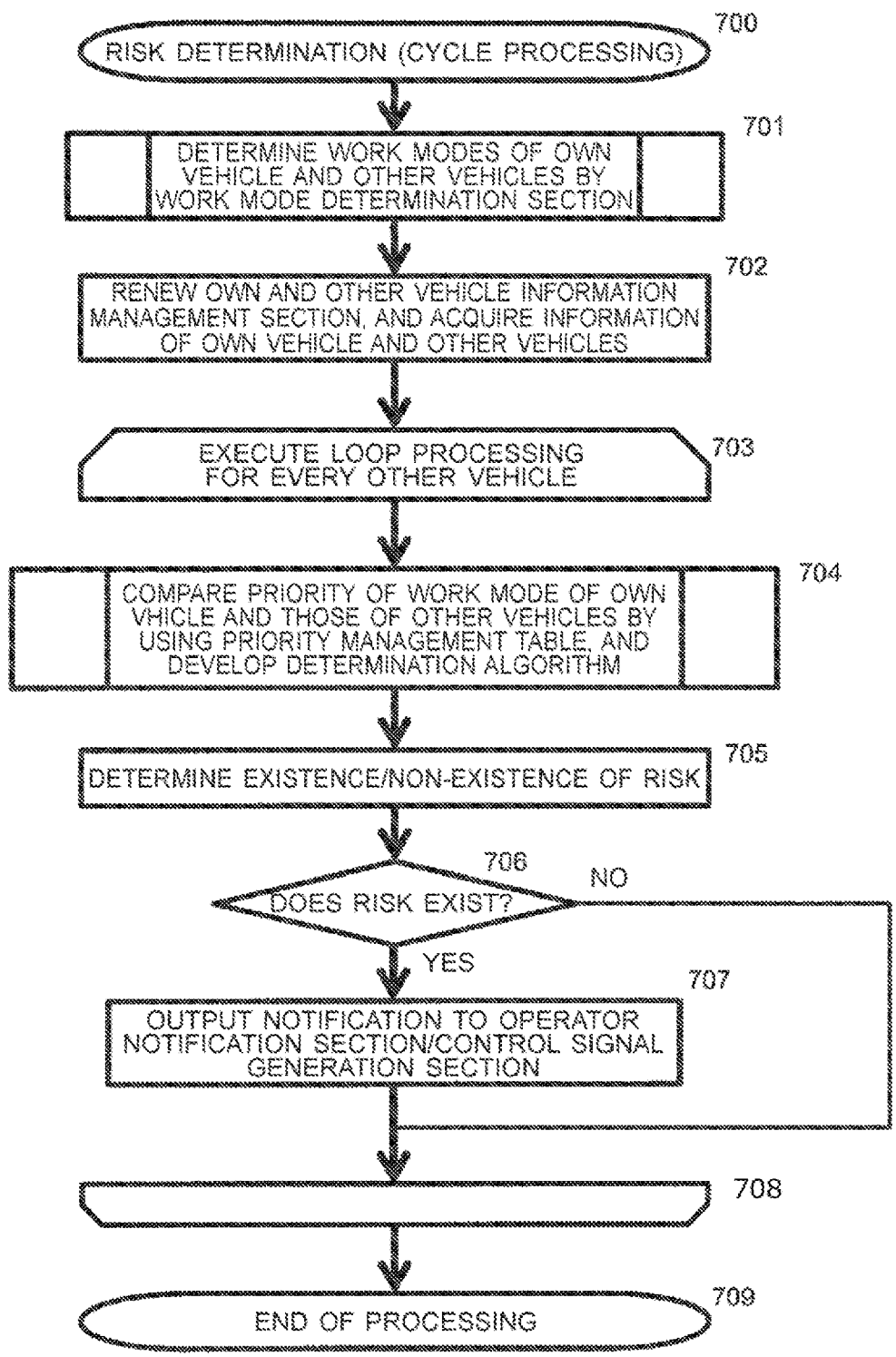
FIG. 7 is a flow chart of risk determination processing.

FIG. 7 is a flow chart of risk determination processing, which is cyclically executed at the work mode determination section 205 and collision risk determination section 206. The work mode determination section 205 and collision risk determination section 206 can execute the work mode determination processing and risk determination processing, which are illustrated in the flow chart of FIG. 7, respectively, by cyclically executing a predetermined program stored beforehand.

The work mode determination section 205 and collision risk determination section 206 start execution of the processing of FIG. 7 in every constant processing cycle set beforehand (step 700).

The work mode determination section 205 performs determination of the work modes of the own vehicle and other vehicles (step 701). Described specifically, the work mode determination section 205 acquires own vehicle information and other vehicle information from the own and other vehicle information management section 204, and based on these information, determines the work modes of the own vehicle and other vehicles. About the details of work mode determination processing to be executed in step 701, a description will be made subsequently herein with reference to the flow charts of FIGS. 8 and 9.

After successful determination of the work modes of the own vehicle and other vehicles in step 701, the work mode determination section 205 sets values, which correspond to the respective determination results, as work modes 423 in the work mode management table 211. Further, the work mode determination section 205 outputs the determination results of the work modes to the own and other vehicle information management section 204, and the own and other vehicle information management section 204 sets the work modes 411, which correspond to the respective determination results, as the work modes 411 in the vehicle information management table 210. As a consequence, the work mode determination section 205 renews the vehicle information management table 210 in the own and other vehicle information management section 204 (step 702). If there is any row, in which the difference in value between the current time and the reception clock time 410 is not smaller than a preset threshold, in the vehicle information management table 210 at this time, the own and other vehicle information management section 204 may preferably delete (reset) the data in the row. After renewal of the vehicle information management table 210 as described above, the collision risk determination section 206 acquires, from the own and other vehicle information management section 204, the own vehicle information and other vehicle information stored in the individual rows of the vehicle information management table 210 so renewed (step 702).

After acquisition of the own vehicle information and other vehicle information in step 702, the collision risk determination section 206 executes loop processing to conduct the below-described processing of step 704 to step 707 with respect to each of the other vehicles (step 703 to step 708). Upon completion of the execution of the loop processing with respect to all the other vehicles about which the other vehicle information has been acquired, the collision risk determination section 206 ends the risk determination processing illustrated in the processing flow of FIG. 7 (step 709).

In the loop processing, the collision risk determination section 206 selects one of the other vehicles as a processing target (hereinafter called "another vehicle"), and develops a determination algorithm to be used for the determination of a risk of collision between the own vehicle and the selected another vehicle (step 704). Described specifically, the collision risk determination section 206 also determines the work modes corresponding to the details of work, which the own vehicle and another vehicle are performing, respectively, based on the value of the work mode 411 in the own vehicle information as set in row 1 of the vehicle information management table 210, and the value of the work mode 411 in another vehicle information as set in other row of the vehicle information management table 210. Upon successful determination of the work modes of the own vehicle and another vehicle as described above, the collision risk determination section 206 sets priorities, which correspond to these work modes, for the own vehicle and another vehicle, respectively, with reference to the priority management table 212, and based on the result of a comparison of these priorities, develops the determination algorithm. About the details of the determination algorithm development processing conducted in step 704, a description will be made subsequently herein with reference to the flow chart of FIG. 10.

After the development of the determination algorithm in step 704, the collision risk determination section 206 determines a risk of collision between the own vehicle and the another vehicle by using the determination algorithm (step 705). In the determination of this risk of collision, the collision risk determination section 206 sets a determination area around the own vehicle according to the determination algorithm, and determines whether the another vehicle exists in the determination area, whereby a determination is made as to whether there is a risk of collision with the another vehicle. If the own vehicle is an excavator, for example, the collision risk determination section 206 sets a circular determination area centering around the position of the own vehicle, and determines whether the another vehicle exists in the determination area. If the own vehicle is a dump truck, on the other hand, the collision risk determination section 206 sets a rectangular determination area while using, as a central axis thereof, the traveling direction of the own vehicle, and determines whether the another vehicle exists in the determination area.

After completion of the determination of the risk of collision in step 705, the collision risk determination section 206 find out whether the determination has resulted in the existence of a risk of collision (step 706). If it has been determined that there is a risk of collision, the processing proceeds to step 707. If it has been determined that there is no risk of collision, on the other hand, the loop processing for the another vehicle is ended.

If the processing has proceeded from step 706 to step 707, the collision risk determination section 206 notifies, to the operator notification section 203 and control signal generation section 207, to the effect that there is a risk of collision with the another vehicle (step 707). As a consequence, warning information is outputted from the operator notification section 203 to the operator user I/F 103, and by the operator user I/F 103, a warning is made to the operator. Further, a control signal is outputted from the control signal generation section 207 to the vehicle control system 104, and by the vehicle control system 104, traveling control is performed to avoid a collision with the another vehicle. The collision risk determination section 206 may make a warning to only one of the operator notification section 203 and the control signal generation section 207. In this modification, only one of a warning by the operator user I/F 103 and traveling control by the vehicle control system. 104 is performed. After execution of the processing of step 707, the collision risk determination section 206 ends the loop processing for the another vehicle.

Figure 8:
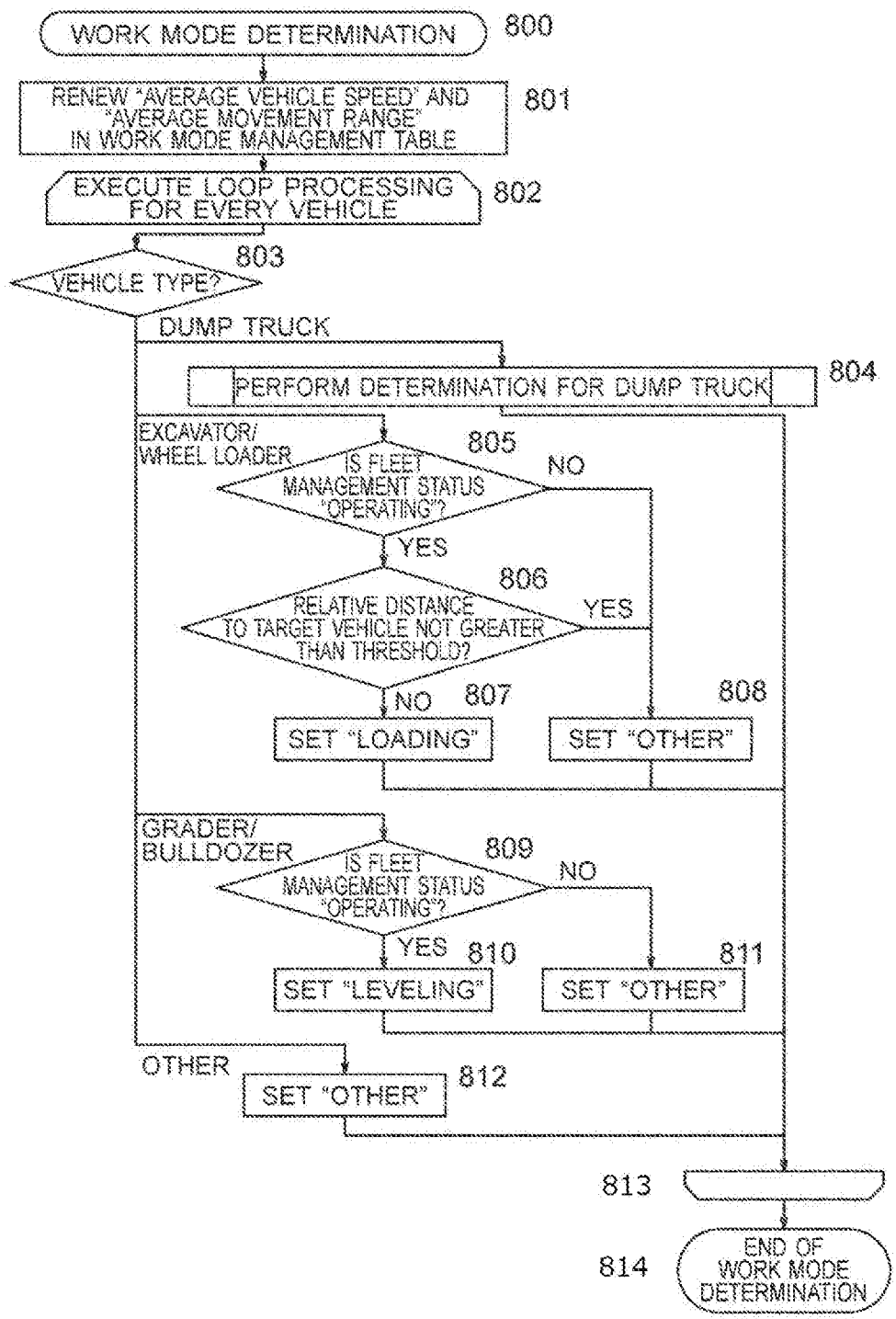
FIG. 8 is a flow chart of work mode determination processing in the first embodiment of the present invention.

FIG. 8 is a flow chart of work mode determination processing in the first embodiment of the present invention. In step 701 of FIG. 7, the work mode determination section 205 starts the execution of the work mode determination processing illustrated in FIG. 8 (step 800).

In the work mode determination processing, the work mode determination section 205 first renews the values of the average vehicle speed 422 and average movement range 423 in the work mode management table 211 (step 801). Described specifically, the work mode determination section 205 also renews the values of the average vehicle speed 422 and average movement range 423 based on the information stored in the vehicle information management table 210 of the own and other vehicle information management section 204. Described more specifically, based on the values of the vehicle speeds 405 of the respective vehicles and the histories of past vehicle speeds 405 of the respective vehicles in the vehicle information management table 210, the work mode determination section 205 determines the current average vehicle speeds of the respective vehicles, and sets them as average vehicle speeds 422 of the respective vehicles. Further, based on the values of the latitudes 403-1, longitudes 403-2 and altitudes 403-3 of the respective vehicles and the histories of past latitudes 403-1, longitudes 403-2 and altitudes 403-3 of the respective values in the vehicle information management table 210, the work mode determination section 205 determines the values of the current movement ranges of the respective vehicles, and sets them as average movement ranges 423 of the respective vehicles. With respect to each vehicle the information of which is set in the work mode management table 211 but is not set in the vehicle information management table 210, the data in the row, which corresponds to the vehicle, in the work mode management table 211 are reset. With respect to each vehicle the information of which is set in the vehicle information management table 210 but is not set in the work mode management table 211, the information corresponding to the vehicle is newly recorded in the work mode management table 211. In this case, as the average vehicle speed 422, the value of the vehicle speed 405 in the vehicle information management table 210 is set, and as the average movement range 423, "0" is set.

After the renewal of the values of the average vehicle speed 422 and average movement range 423 in step 801, the work mode determination section 205 executes, with respect to each vehicle the information of which is set in the work mode management table 211, loop processing to conduct the below-described processing of from step 803 to step 812 (step 802 to step 813). Upon completion of the execution of the loop processing with respect to all the vehicles, the work mode determination section 205 ends the work mode determination processing illustrated in the processing flow of FIG. 8 (step 814).

In the loop processing, the work mode determination section 205 selects, the own vehicle and, as a processing target, one of the other vehicles. Based on the details of the corresponding vehicle type 402 in the vehicle information management table 210, the work mode determination section 205 then determines the type of the vehicle (step 803). As a result, the processing proceeds to step 804 if the vehicle is a dump truck, to step 805 if the vehicle is an excavator or wheel loader, or to step 809 if the vehicle is a grader or bulldozer. Further, if the vehicle is not of any of the above-described vehicle types, for example, is a light vehicle or the like, the processing proceeds to step 812.

If the processing has proceeded from step 803 to step 804, the work mode determination section 205 executes the determination of work mode for dump truck (step 804). About the details of the determination of work mode for dump truck as conducted in this step 804, a description will be made subsequently herein with reference to the processing flow of FIG. 9. After execution of the processing of step 804, the work mode determination section 205 ends the loop processing for the vehicle.

If the processing has proceeded from step 803 to step 805, the work mode determination section 205 determines whether the fleet management status of the vehicle is "operating" (step 805). Described specifically, with reference to the fleet management status 409 in the row, which corresponds to the vehicle, of the vehicle information management table 210, the work mode determination section 205 also determines what the fleet management status of the vehicle is. As a result, the processing proceeds to step 806 if the fleet management status of the vehicle is "operating", or to step 808 if the fleet management status of the vehicle is "not operating".

If the processing has proceeded from step 805 to step 806, the work mode determination section 205 determines whether the relative distance between the vehicle and the target vehicle in the work by the vehicle is not greater than a preset threshold (step 806). Described specifically, with reference to the fleet management status 409 in the row, which corresponds to the vehicle, of the vehicle information management table 210, the work mode determination section 205 determines whether there is the dump truck as a target vehicle, which is a loading destination of ore or the like, in the work performed by the vehicle that is the excavator or wheel loader. If it has been determined, as a result, that there is the dump truck as the target vehicle, the work mode determination section 205 conducts a search, from the value of the vehicle identifier 401 of the target vehicle as stored as the fleet management status 409, for a row, which corresponds to the target vehicle, in the vehicle information management table 210. Based on the values of the latitude 403-1 and longitude 403-2 of the vehicle and the values of the latitude 403-1 and longitude 403-2 of the target vehicle as recorded in the row located by the search, the work mode determination section 205 then computes the relative distance between the vehicle and the target vehicle. As a result, if the computed relative distance is not greater than a preset threshold, the processing proceeds to step 807. If the target vehicle does not exist in the work performed by the vehicle or if the computed relative distance is not smaller than the preset threshold, on the other hand, the processing proceeds to step 808.

If the processing has proceeded from step 806 to step 807, the work mode determination section 205 sets "loading" as the work mode of the vehicle (step 807). Described specifically, the work mode determination section 205 sets "loading" as the details of the work mode 424 in the row, which corresponds to the vehicle, of the work mode management table 211. In addition, the work mode determination section 205 also similarly sets "loading" as the details of the work mode 411 in the row, which corresponds to the vehicle, of the vehicle information management table 210. After execution of the processing of step 807, the work mode determination section 205 ends the loop processing for the vehicle.

If the processing has proceeded from step 805 or 806 to step 808, the work mode determination section 205 sets "other" as the work mode of the vehicle (step 808). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 808, the work mode determination section 205 ends the loop processing for the vehicle.

If the processing has proceeded from step 803 to step 809, the work mode determination section 205 determines whether the fleet management status of the vehicle is "operating" (step 809). Described specifically, with reference to the fleet management status 409 in the row, which corresponds to the vehicle, of the vehicle information management table 210, the work mode determination section 205 determines what the fleet management status of the vehicle is. As a result, the processing proceeds to step 810 if the fleet management status of the vehicle is "operating", or to step 811 if the fleet management status of the vehicle is "not operating".

If the processing has proceeded from step 809 to step 810, the work mode determination section 205 sets "leveling" as the work mode of the vehicle (step 810). Described specifically, the work mode determination section 205 sets "leveling" as the details of the work mode 424 in the row, which corresponds to the vehicle, of the work mode management table 211. In addition, the work mode determination section 205 also similarly sets "leveling" as the details of the work mode 411 in the row, which corresponds to the vehicle, of the vehicle information management table 210. After execution of the processing of step 810, the work mode determination section 205 ends the loop processing for the vehicle.

If the processing has proceeded from step 809 to step 811, the work mode determination section 205 sets "other" as the work mode of the vehicle (step 811). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 811, the work mode determination section 205 ends the loop processing for the vehicle.

If the processing has proceeded from step 803 to step 812, the work mode determination section 205 sets "other" as the work mode of the vehicle (step 812). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 812, the work mode determination section 205 ends the loop processing for the vehicle.

Figure 9:
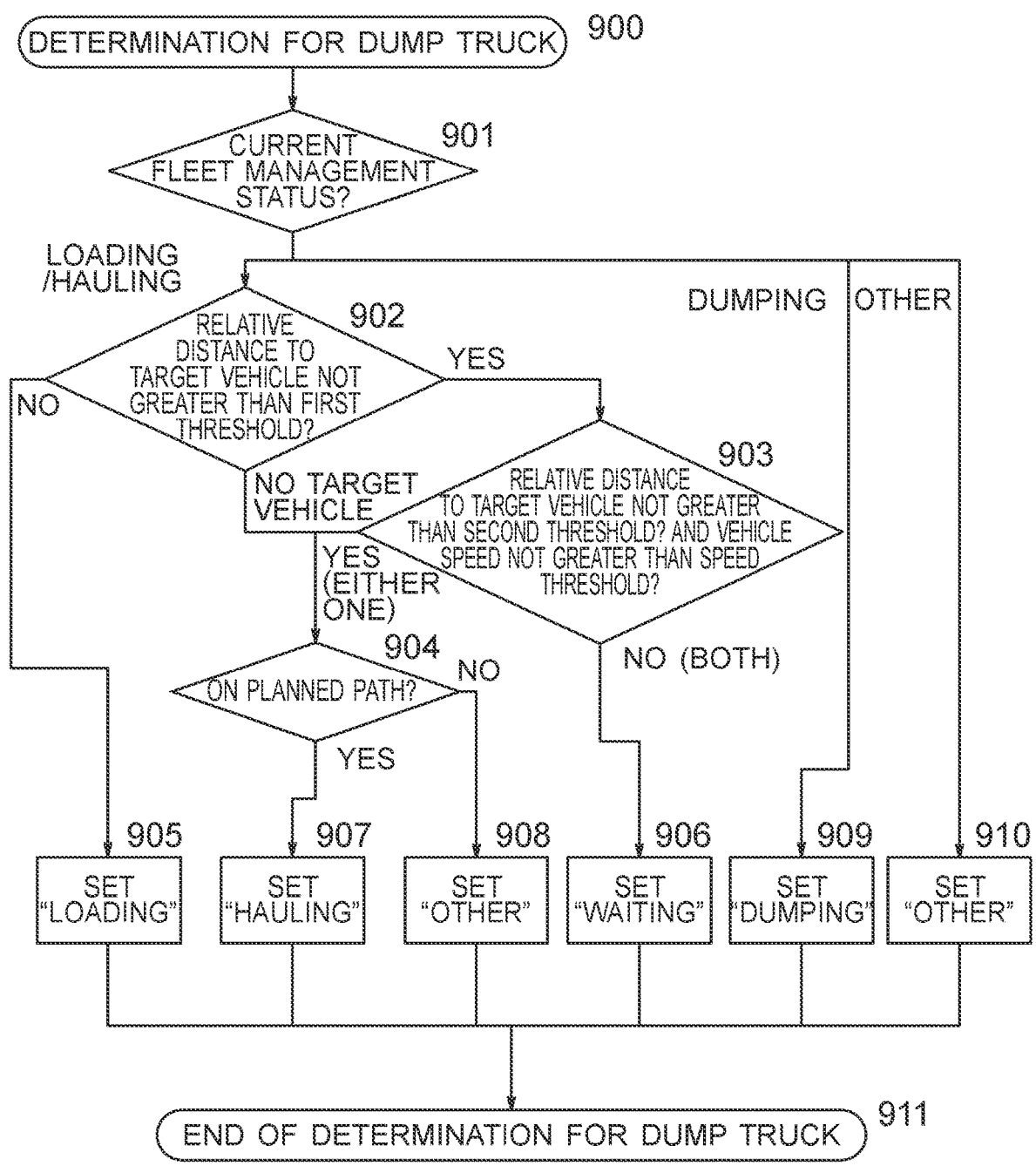
FIG. 9 is a flow chart of work mode determination for dump truck in the first embodiment of the present invention.

FIG. 9 is a flow chart of work mode determination for dump truck in the first embodiment of the present invention.

In step 804 of FIG. 8, the work mode determination section 205 starts the work mode determination for dump truck as illustrated in FIG. 9 (step 900).

In the work mode determination for dump truck, the work mode determination section 205 first confirms the fleet operation status of the vehicle (step 901). Described specifically, with reference to the fleet management status 409 in the row, which corresponds to the vehicle, of the vehicle information management table 210, the work mode determination section 205 determines what the fleet management status of the vehicle is. As a result, the processing proceeds to step 902 if the fleet management status of the vehicle is "loading" or "hauling", to step 909 if the fleet management status of the vehicle is "dumping", or to step 910 if the fleet management status of the vehicle is other than "loading", "hauling" or "dumping".

If the processing has proceeded from step 901 to step 902, the work mode determination section 205 determines whether the relative distance between the vehicle and the target vehicle in the work by the vehicle is not greater than a preset first threshold (step 902). Described specifically, with reference to the fleet management status 409 in the row, which corresponds to the vehicle, of the vehicle information management table 210, the work mode determination section 205 determines whether there is an excavator or wheel loader as the target vehicle in loading work performed by the vehicle that is the dump truck. If it has been determined, as a result, that there is the excavator or wheel loader as the target vehicle, the work mode determination section 205 conducts a search, from the value of the vehicle identifier 401 of the target vehicle as stored as the fleet management status 409, for a row, which corresponds to the target vehicle, in the vehicle information management table 210. Based on the values of the latitude 403-1 and longitude 403-2 of the vehicle and the values of the latitude 403-1 and longitude 403-2 of the target vehicle as recorded in the row located by the search, the work mode determination section 205 then computes the relative distance between the vehicle and the target vehicle. As a result, if the computed relative distance is not greater than the preset first threshold, the processing proceeds to step 905. If the target vehicle does not exist in the work which is being performed by the vehicle, on the other hand, the processing proceeds to step 904.

If the processing has proceeded from step 902 to step 903, the work mode determination section 205 determines whether the relative distance between the vehicle and the target vehicle as computed in step 902 is not smaller than a preset second threshold as a value greater than the first threshold and the speed of the vehicle is not greater than a preset speed threshold (step 903). Described specifically, the work mode determination section 205 acquires the speed of the vehicle, i.e., the dump truck from the value set as the vehicle speed 405 in the row, which corresponds to the vehicle, of the vehicle information management table 210. As a result, if the relative distance between the vehicle and the target vehicle is not greater than the second threshold and the speed of the vehicle is not greater than the preset speed threshold, the processing proceeds to step 906. If the relative distance between the vehicle and the target vehicle is not smaller than the second threshold or if the speed of the vehicle is not smaller than the preset speed threshold, on the other hand on the other hand, the processing proceeds to step 904.

If the processing has proceeded from step 902 or step 903 to step 904, the work mode determination section 205 determines whether the current position of the vehicle as the dump truck is on a planned path (step 904). Described specifically, with reference to the path information set as the fleet management status 409 in the row, which corresponds to the vehicle, of the vehicle information management table 210, the work mode determination section 205 specifies the planned path along which the vehicle as the dump truck travels during haulage. By comparing the specified planned path with the values of the latitude 403-1, longitude 403-2 and altitude 403-3, the work mode determination section 205 then determines whether the current position of the vehicle exists on the planned path. As a result, the processing proceeds to step 907 if the current position of the vehicle is on the planned path, or to step 908 if the current position of the vehicle is off the planned path.

If the processing has proceeded from step 902 to step 905, the work mode determination section 205 sets "loading" as the work mode of the vehicle (step 905). Described specifically, the work mode determination section 205 sets "loading" as the details of the work mode 424 in the row, which corresponds to the vehicle, of the work mode management table 211. In addition, the work mode determination section 205 also similarly sets "loading" as the details of the work mode 411 in the row, which corresponds to the vehicle, of the vehicle information management table 210. After execution of the processing of step 905, the work mode determination section 205 ends the work mode determination for the vehicle, i.e., the dump truck (step 911).

If the processing has proceeded from step 903 to step 906, the work mode determination section 205 sets "waiting" as the work mode of the vehicle (step 906). Described specifically, the work mode determination section 205 sets "waiting" as the details of the work mode 424 in the row, which corresponds to the vehicle, of the work mode management table 211. In addition, the work mode determination section 205 also similarly sets "waiting" as the details of the work mode 411 in the row, which corresponds to the vehicle, of the vehicle information management table 210. After execution of the processing of step 906, the work mode determination section 205 ends the work mode determination for the vehicle, i.e., the dump truck (step 911).

If the processing has proceeded from step 904 to step 907, the work mode determination section 205 sets "hauling" as the work mode of the vehicle (step 907). Described specifically, the work mode determination section 205 sets "hauling" as the details of the work mode 424 in the row, which corresponds to the vehicle, of the work mode management table 211. In addition, the work mode determination section 205 also similarly sets "hauling" as the details of the work mode 411 in the row, which corresponds to the vehicle, of the vehicle information management table 210. After execution of the processing of step 907, the work mode determination section 205 ends the work mode determination for the vehicle, i.e., the dump truck (step 911).

If the processing has proceeded from step 904 to step 908, the work mode determination section 205 sets "other" as the work mode of the vehicle (step 908). Described specifically, the work mode determination section 205 also sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 908, the work mode determination section 205 ends the work mode determination for the vehicle, i.e., the dump truck (step 911).

If the processing has proceeded from step 901 to step 909, the work mode determination section 205 sets "dumping" as the work mode of the vehicle (step 909). Described specifically, the work mode determination section 205 also sets "dumping" as the details of the work mode 424 in the row, which corresponds to the vehicle, of the work mode management table 211. In addition, the work mode determination section 205 also similarly sets "dumping" as the details of the work mode 411 in the row, which corresponds to the vehicle, of the vehicle information management table 210. After execution of the processing of step 909, the work mode determination section 205 ends the work mode determination for the vehicle, i.e., the dump truck (step 911).

If the processing has proceeded from step 901 to step 910, the work mode determination section 205 sets "other" as the work mode of the vehicle (step 910). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 910, the work mode determination section 205 ends the work mode determination for the vehicle, i.e., the dump truck (step 911).

By executing the above-described processing of FIG. 8 and FIG. 9, the work mode determination section 205 can estimate the details of work, which the own vehicle and other vehicles are performing, respectively, based on the own vehicle information and other vehicle information stored in the vehicle information management table 210 of the own and other vehicle information management section 204.

Figure 10:
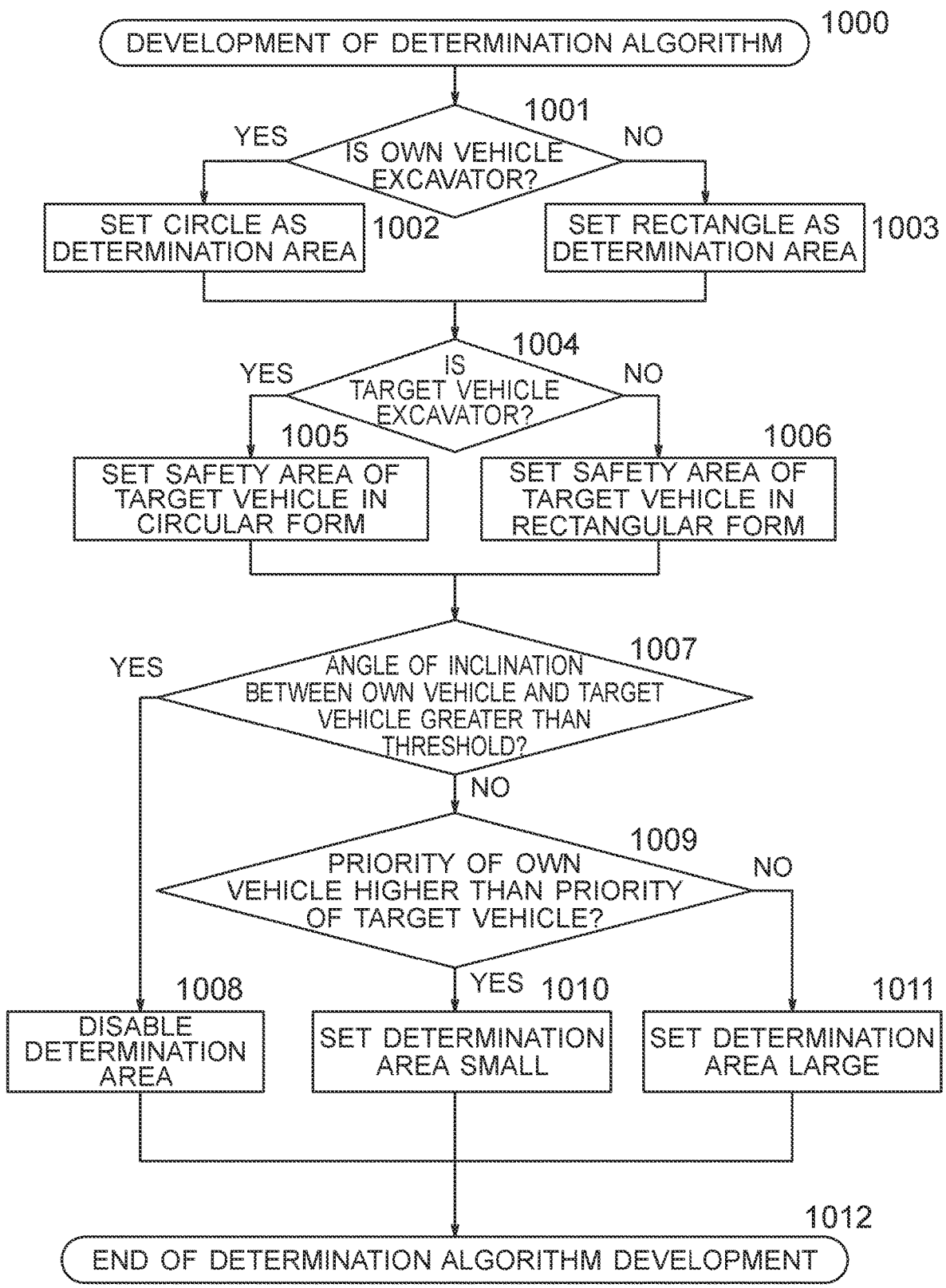
FIG. 10 is a flow chart of determination algorithm development processing.

FIG. 10 is a flow chart of determination algorithm development processing. In step 704 of FIG. 7, the collision risk determination section 206 starts execution of the determination algorithm development processing illustrated in FIG. 10 (step 1000). In this embodiment, a description will be made about the case that a rectangular or circular determination area is set, as a determination algorithm for a risk of collision between own vehicle and another vehicle, around the own vehicle and the existence or non-existence of the risk of collision is determined from the state of overlapping between the determination area and a safety area of the another vehicle.

In the determination algorithm development processing, the collision risk determination section 206 first determines whether the own vehicle is an excavator (step 1001). Described specifically, with reference to the details of the vehicle type 402 of the own vehicle information as stored in row 1 in the vehicle information management table 210 of the own and other vehicle information management section 204, the collision risk determination section 206 finds out what the type of the own vehicle is. As a result, the processing proceeds to step 1002 if the type of the own vehicle is "excavator", or to step 1003 if the type of the own vehicle is other than "excavator".

If the processing has proceeded from step 1001 to step 1002, the collision risk determination section 206 sets a circular determination area around the own vehicle (step 1002). Described specifically, the collision risk determination section 206 sets a circular determination area, which corresponds to the own vehicle, for example, by taking the center of a circle as the position of the own vehicle. The size of the radius of the determination area can be set beforehand, for example, based on the length of the arm of the own vehicle as the excavator.

If the processing has proceeded from step 1001 to step 1003, the collision risk determination section 206 sets a rectangular determination area around the own vehicle (step 1003). Described specifically, the collision risk determination section 206 sets a rectangular determination area such that the central axis of the rectangular determination area in its longitudinal direction extends in parallel to the traveling direction of the own vehicle and the own vehicle is located on the central axis.

After the determination area corresponding to the own vehicle has been set in step 1002 or 1003, the collision risk determination section 206 determines whether a target vehicle to be determined for its risk of collision with the own vehicle is an excavator (step 1004). Described specifically, taking as the target vehicle the another vehicle selected as the processing target in the loop processing of FIG. 7 and referring to the value of the vehicle type 402 of the another vehicle as stored in the vehicle information management table 210 of the own and other vehicle information management section 204, the collision risk determination section 206 finds out what the type of the target vehicle is. As a result, the processing proceeds to step 1005 if the type of the target vehicle is "excavator", but to step 1006 if the type of the target vehicle is other than "excavator".

If the processing has proceeded from step 1004 to step 1005, the collision risk determination section 206 sets a circular safety area as a safety area corresponding to the target vehicle (step 1005). Described specifically, the collision risk determination section 206 sets a circular safety area, which corresponds to the target vehicle, for example, by taking the center of a circle as the position of the target vehicle. The size of the radius of the circular safety area can be set, for example, based on the length of an arm of an excavator as the target vehicle.

If the processing has proceeded from step 1004 to step 1006, the collision risk determination section 206 sets a rectangular safety area as a safety area corresponding to the target vehicle (step 1006). Described specifically, the collision risk determination section 206 sets a rectangular safety area corresponding to the target vehicle such that the central axis of the rectangular safety area in its longitudinal direction extends in parallel to the traveling direction of the target vehicle and the target vehicle is located on the central axis.

After the safety area corresponding to the target vehicle has been set in step 1005 or 1006, the collision risk determination section 206 determines whether the angle of inclination between the own vehicle and the target vehicle is not greater than a preset threshold (step 1007). Described specifically, based on the values of the latitude 403-1 and longitude 403-2 of the own vehicle and the values of the latitude 403-1 and longitude 403-2 of the target vehicle as recorded in the vehicle information management table 210, the collision risk determination section 206 computes the relative distance between the own vehicle and the target vehicle. Further, based on the values of the latitude 403-1 and longitude 403-2 of the own vehicle and the values of the latitude 403-1 and longitude 403-2 of the target vehicle as recorded in the vehicle information management table 210, the collision risk determination section 206 computes the difference in altitude between the own vehicle and the target vehicle. Then, based on the computed relative distance and altitude difference, the collision risk determination section 206 calculates the angle of inclination of a line connecting the own vehicle and the target vehicle each other, and determines whether the angle of inclination is not greater than a preset threshold. As a result, if the angle of inclination is not greater than the preset threshold, the collision risk determination section 206 determines that there is a possibility of a collision between the own vehicle and the target vehicle in a three-dimensional space, and the processing then proceeds to step 1009. If the angle of inclination is greater than the preset threshold, on the other hand, the collision risk determination section 206 determines that there is no possibility of collision between the own vehicle and the target vehicle in a three-dimensional space, and the processing then proceeds to step 1008.

If the processing has proceeded from step 1007 to step 1008, the collision risk determination section 206 disables the determination area set in step 1002 or 1003 (step 1008). Described specifically, the collision risk determination section 206 disables the determination area either by decreasing to zero (0) the radius of the circular determination area set in step 1002 or by decreasing to zero (0) the length of each side of the rectangular determination area set in step 1003. As a consequence, it is configured to certainly determine no risk in the determination of a risk of collision to be conducted in step 705 of FIG. 7. As an alternative, the determination area may be disabled by setting a preset disable flag without changing the size of the determination area. After execution of the processing of step 1008, the collision risk determination section 206 ends the determination algorithm development processing for the another vehicle (step 1012).

If the processing has proceeded from step 1007 to step 1009, the collision risk determination section 206 compares the priority of the own vehicle with that of the target vehicle, and determines whether the priority of the own vehicle is higher than that of the target vehicle (step 1009). Described specifically, in the priority management table 212, the collision risk determination section 206 specifies a row in which the vehicle type 441 and the work mode 442 conform with the vehicle type 402 and work mode 411 of the own vehicle in the vehicle information management table 210, respectively, and acquires the value of the priority 443 in the row as the priority of the own vehicle. As a consequence, the priority of the own vehicle is set based on the work that the own vehicle is performing. Further, in the priority management table 212, the collision risk determination section 206 also specifies a row in which the vehicle type 441 and the work mode 442 conform with the vehicle type 402 and work mode 411 of the another vehicle in the vehicle information management table 210, respectively, and acquires the value of the priority 443 in the row as the priority of the target vehicle. As a consequence, the priority of the target vehicle is set based on the work that the target vehicle is performing. Then, the collision risk determination section 206 compares the acquired priority of the own vehicle with that of the target vehicle and, if the value of the priority of the own vehicle is smaller than that of the priority of the target vehicle, determines that the priority of the own vehicle is higher than that of the target vehicle, and the processing proceeds to step 1010. If the value of priority of the own vehicle is greater than that of the priority of the target vehicle, on the other hand, the collision risk determination section 206 determines that the priority of the own vehicle is lower than that of the target vehicle, and the processing proceeds to step 1011. If the value of the priority of the own vehicle and that of the priority of the target vehicle are identical to each other, the processing may proceed to either step 1010 or step 1011.

If the processing has proceeded from step 1009 to step 1010, the collision risk determination section 206 sets smaller the determination area which has been set in step 1002 or 1003 (step 1010). Described specifically, the collision risk determination section 206 makes the size of the radius of the circular determination area, which has been set in step 1002, smaller than the original value, for example, by multiplying the radius with a factor smaller than 1, or makes the length of each side of the rectangular determination area, which has been set in step 1003, smaller than the original value, for example, by multiplying the side with a factor smaller than 1. By changing the size of the determination area in a decreasing direction as described above, it is configured, in the determination of a risk of collision to be conducted in step 705 of FIG. 7, to hardly obtain a determination result that there is a risk. As a consequence, a warning to the another vehicle through the operator user I/F 103 and an application of traveling control to the vehicle control system 104 for the avoidance of a collision are suppressed. The above-described factor may be varied depending on the magnitude of the difference in priority between the own vehicle and the another vehicle. As an alternative, by changing, in a decreasing direction, the size of the safety area of the another vehicle as set in step 1005 or 1006, it may be made difficult to obtain a determination result that there is a risk, upon determination of a risk of collision. After execution of the processing of step 1010, the collision risk determination section 206 ends the determination algorithm development processing for the another vehicle (step 1012).

If the processing has proceeded from step 1009 to step 1011, the collision risk determination section 206 sets greater the determination area set in step 1002 or 1003 (step 1011). Described specifically, the collision risk determination section 206 makes the size of the radius of the circular determination area, which has been set in step 1002, larger than the original value, for example, by multiplying the radius with a factor greater than 1, or makes the length of each side of the rectangular determination area, which has been set in step 1003, greater than the original value, for example, by multiplying the side with a factor greater than 1. By changing the size of the determination area in an increasing direction as described above, it may be made easier to obtain a determination result that there is a risk, upon the determination of a risk of collision to be conducted in step 705 of FIG. 7. As a consequence, a warning to the another vehicle through the operator user I/F 103 and an application of traveling control to the another vehicle by the vehicle control system 104 for the avoidance of a collision are promoted. As an alternative, by changing, in an increasing direction, the size of the safety area of the another vehicle as set in step 1005 or 1006, it may be made easier to obtain a determination result that there is a risk, upon determination of a risk of collision. After execution of the processing of step 1011, the collision risk determination section 206 ends the determination algorithm development processing for the another vehicle (step 1012).

By executing the above-described processing of FIG. 10, the collision risk determination section 206 can set the priority of the own vehicle and that of the another vehicle based of the details of the work that the own vehicle and another vehicle are performing, respectively, and based on these priorities, can change the determination algorithm to be used for the determination of a risk of collision between the own vehicle and the another vehicle.

By such determination algorithm development processing as in FIG. 10, such a determination area as illustrated in FIGS. 11A and 11B, FIGS. 12A and 12B, or FIGS. 13A, 13B and 13C is set around the own vehicle and the determination of a risk of collision between the own vehicle and the another vehicle is made using the determination area. Hereinafter, specific examples of the determination of a risk of collision will be described with reference to FIGS. 11A and 11B, FIGS. 12A and 12B, and FIGS. 13A, 13B and 13C, respectively.

Figure 11A:
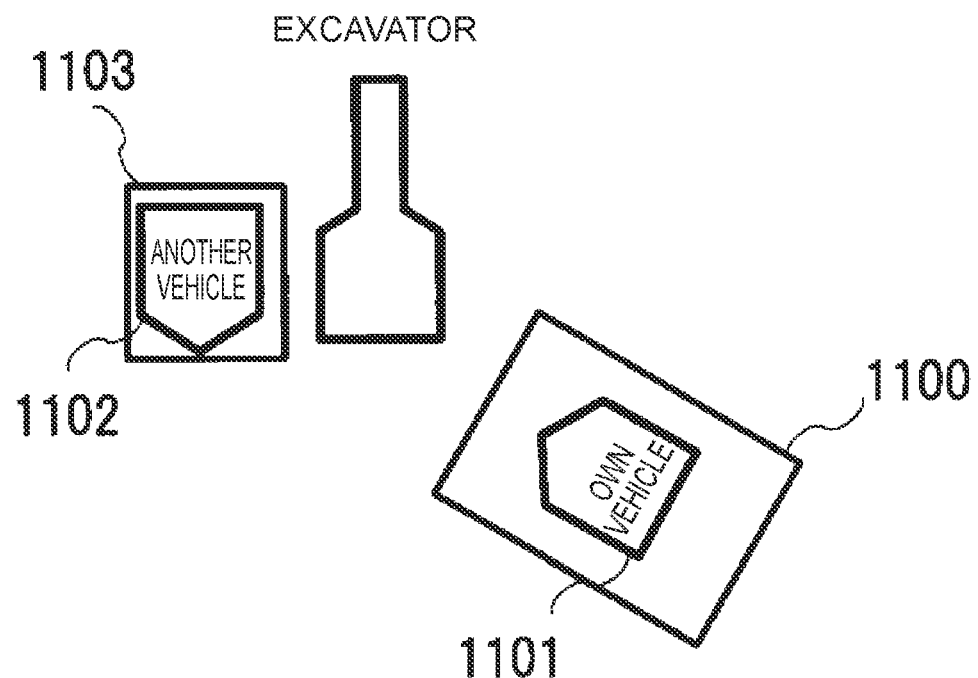
FIGS. 11A and 11B are diagrams illustrating a specific example of the determination of a risk of collision in a scene of double-side loading.
Figure 11B:
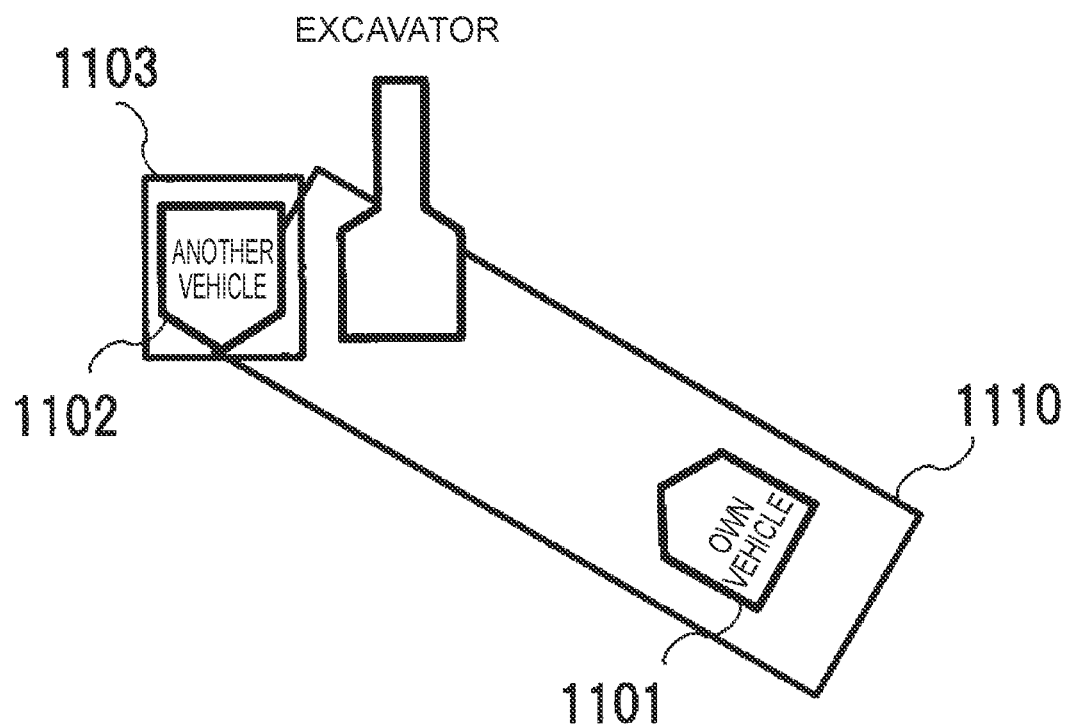

FIGS. 11A and 11B are diagrams illustrating a specific example of the determination of a risk of collision in a scene of double-side loading.

FIG. 11A illustrates a situation that another vehicle 1102 as a dump truck is under loading work beside an excavator and own vehicle 1101 as a dump truck has approached the excavator for loading work of ore or the like. As the work modes of the own vehicle 1101 and another vehicle 1102 are both "loading" in this situation, the priority of the own vehicle 1101 and that of the another vehicle 1102 have the same value. As a result, a small rectangular determination area 1100 is set as a determination area for the own vehicle 1101 relative to the another vehicle 1102. Therefore, the determination area 1100 and a safety area 1103 of the another vehicle 1102 do not overlap with each other, whereby it is determined that there is no risk of collision.

On the other hand, FIG. 11B illustrates a situation that another vehicle 1102 is under loading work beside the excavator and own vehicle 1101 has approached the excavator during hauling work. Because in this situation, the work mode of the own vehicle 1101 is "hauling" while the work mode of the another vehicle 1102 is "loading", the priority of the own vehicle 1101 is lower than that of the another vehicle 1102. As a result, a large rectangular determination area 1110 is set as a determination area for the own vehicle 1101 relative to the another vehicle 1102. Therefore, compared with the situation of FIG. 11A, despite the own vehicle 1101 is located at a position remote from the another vehicle 1102, the determination area 1110 and the safety area 1103 of the another vehicle 1102 overlap with each other, whereby it is determined that there is a risk of collision. As a result, taking the another vehicle 1102 as a target, a warning to the operator and traveling control for the avoidance of a collision are performed at the own vehicle 1101.

Figure 12B:
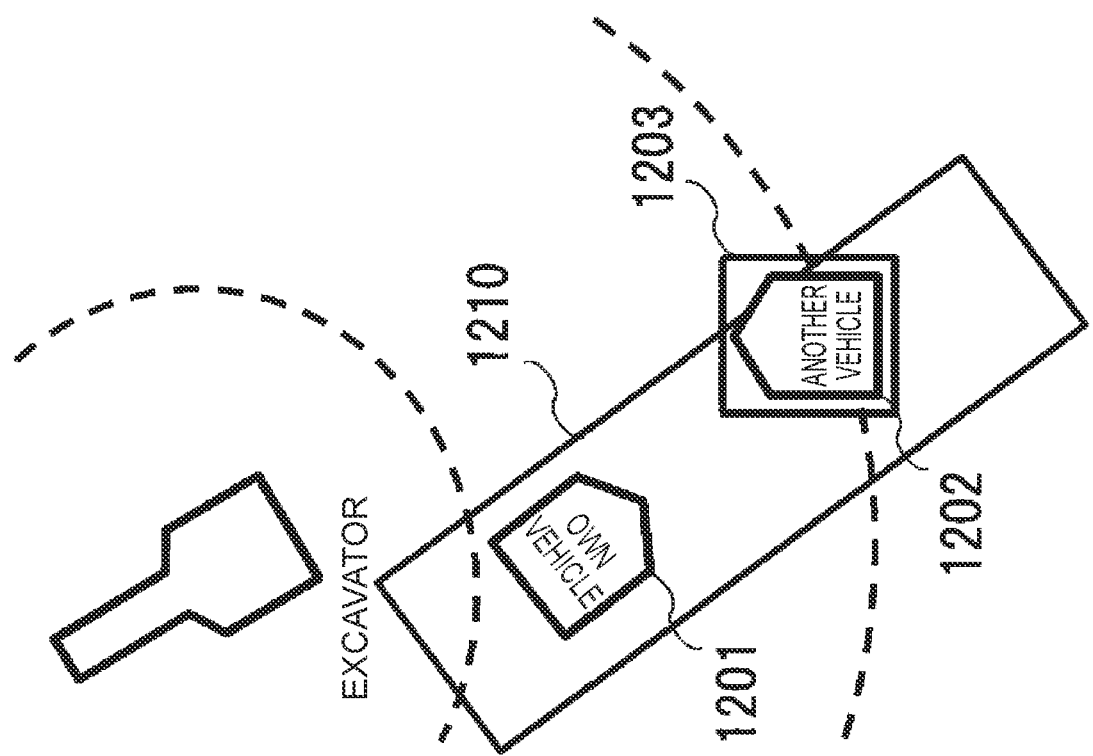
FIGS. 12A and 12B are diagrams illustrating a specific example of the determination of a risk of collision in a scene in which a dump truck is waiting for loading.
Figure 12A:
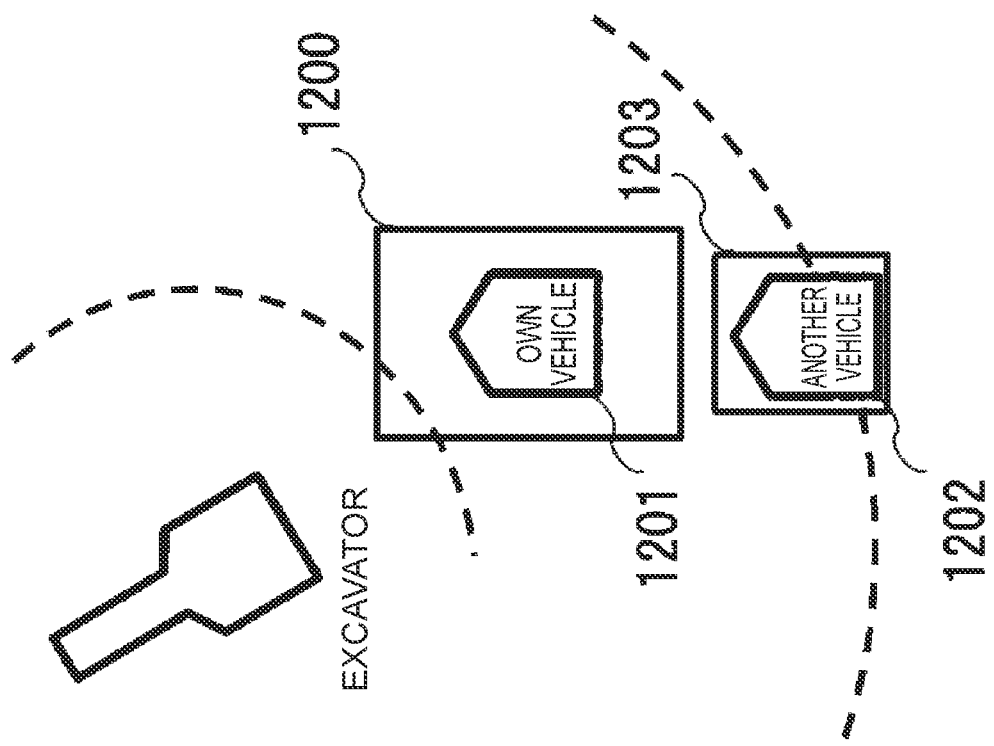

FIGS. 12A and 12B are diagrams illustrating a specific example of the determination of a risk of collision in a scene where a dump truck is waiting for loading.

FIG. 12A illustrates a situation that own vehicle 1201 and another vehicle 1202 as dump trucks are both waiting for loading of ore or the like from an excavator. As the work modes of the own vehicle 1201 and another vehicle 1202 are both "waiting" in this situation, the priority of the own vehicle 1201 and that of the another vehicle 1202 have the same value. As a result, a small rectangular determination area 1200 is set as a determination area for the own vehicle 1201 relative to the another vehicle 1202. Therefore, the determination area 1200 and a safety area 1203 of the another vehicle 1202 do not overlap with each other, whereby it is determined that there is no risk of collision.

On the other hand, FIG. 12B illustrates a situation that the another vehicle 1202 is waiting and the own vehicle 1201 has gone through with loading work and has begun hauling toward a dumping site. Because in this situation, the work mode of the own vehicle 1201 is "hauling" while the work mode of the another vehicle 1202 is "waiting", the priority of the own vehicle 1201 is lower than that of the another vehicle 1202. As a result, a large rectangular determination area 1210 is set as a determination area for the own vehicle 1201 relative to the another vehicle 1202. Therefore, the determination area 1210 and the safety area 1203 of the another vehicle 1202 overlap with each other, whereby it is determined that there is a risk of collision. As a result, taking the another vehicle 1202 as a target, a warning to the operator and traveling control for the avoidance of a collision are performed at the own vehicle 1201.

Figure 13A:
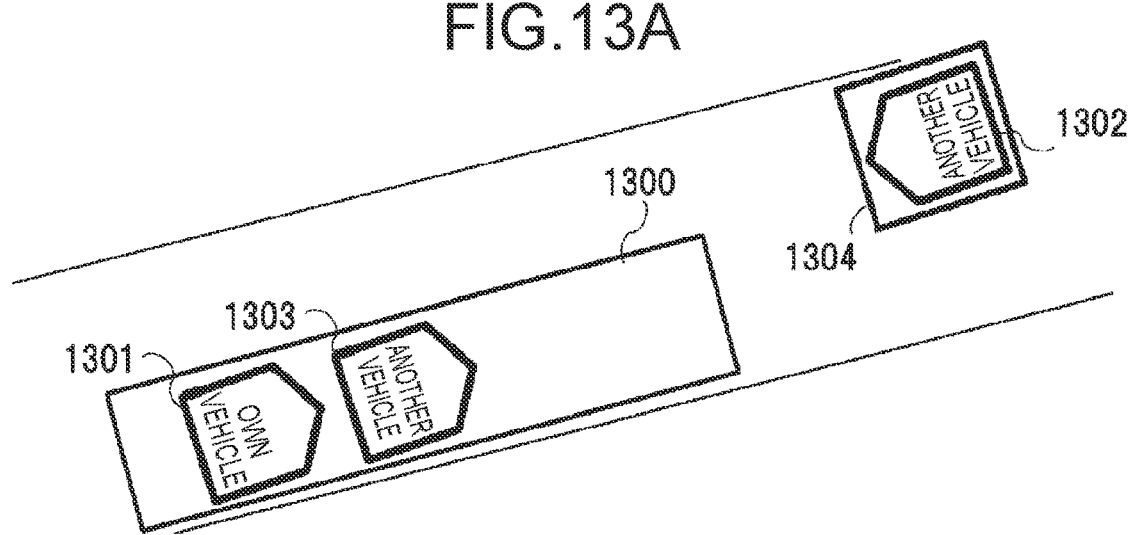
FIGS. 13A, 13B and 13C are diagrams illustrating a specific example of the determination of a risk of collision in a scene of passing.
Figure 13B:
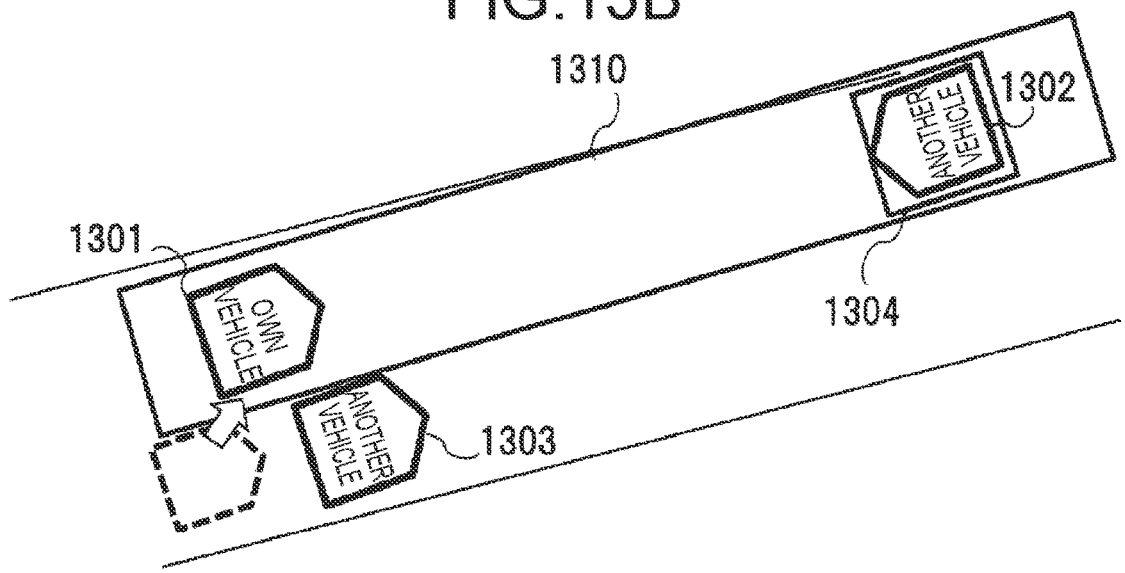
Figure 13C:
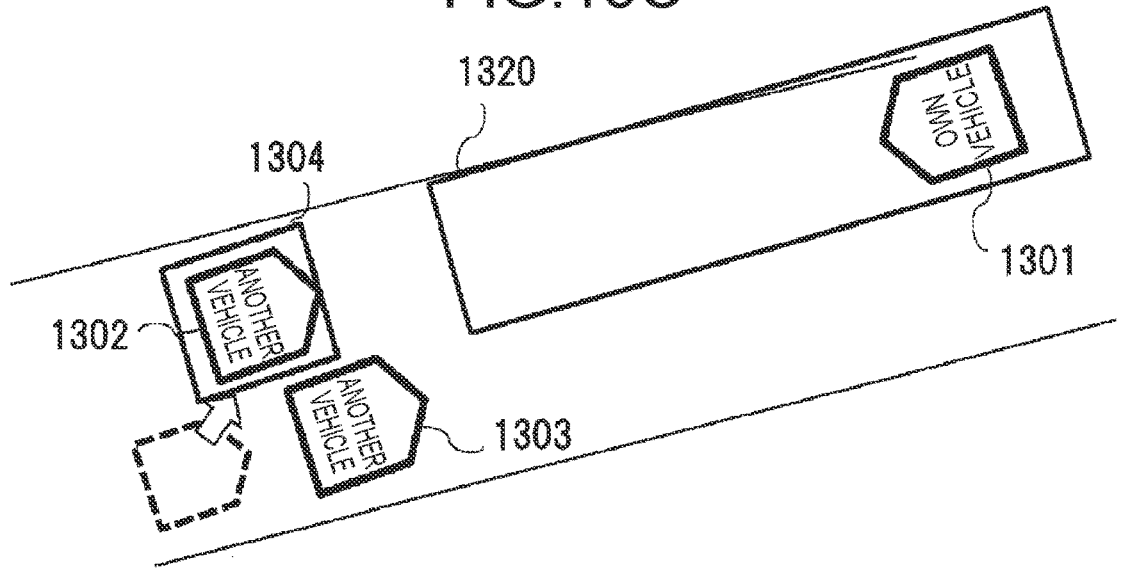

FIGS. 13A, 13B and 13C are diagrams illustrating a specific example of the determination of a risk of collision in a scene of passing.

FIG. 13A illustrates a situation that, when own vehicle 1301 and another vehicle 1302 as dump trucks are both traveling on a preset travel path to haul ore or the like, a further vehicle 1303 is traveling ahead of the own vehicle 1301. As the work modes of the own vehicle 1301 and another vehicle 1302 are both "hauling" in this situation, the priority of the own vehicle 1301 and that of the another vehicle 1302 have the same value. As a result, a rectangular determination area 1300 is set as a determination area for the own vehicle 1301 relative to the another vehicle 1302. Therefore, the determination area 1300 and a safety area 1304 of the another vehicle 1302 do not overlap with each other, whereby it is determined that there is no risk of collision.

On the other hand, FIG. 13B illustrates a situation that the own vehicle 1301 is about to pass the preceding further vehicle 1303. Because in this situation, the work mode of the another vehicle 1302 remains to be "hauling" while the work mode of the own vehicle 1301 changes to "other" because of its departure from the preset travel path, the priority of the own vehicle 1301 is lower than that of the another vehicle 1302. As a result, a rectangular determination area 1310 larger than that in FIG. 13A is set as a determination area for the own vehicle 1301 relative to the another vehicle 1302. Therefore, the determination area 1310 and the safety area 1304 of the another vehicle 1302 overlap with each other, whereby it is determined that there is a risk of collision. As a result, taking the another vehicle 1302 as a target, a warning to the operator and traveling control for the avoidance of a collision are performed at the own vehicle 1301.

Further, FIG. 13C illustrates a situation that in the same scene as in FIG. 13B, the own vehicle 1301 and the another vehicle 1302 have been replaced with each other. In this situation, opposite to the situation of FIG. 13B, the work mode of the own vehicle 1301 remains to be "hauling" while the work mode of the another vehicle 1302 changes to "other" because of its departure from the preset travel path. Therefore, the priority of the own vehicle 1301 is higher than that of the another vehicle 1302. As a result, a rectangular determination area 1320 smaller than that in FIG. 13B is set as a determination area for the own vehicle 1301 relative to the another vehicle 1302. Therefore, the determination area 1320 and the safety area 1304 of the another vehicle 1302 do not overlap with each other, whereby it is determined that there is no risk of collision. As a result, different from the situation of FIG. 13B, neither a warning to the operator nor traveling control for the avoidance of a collision is performed at the own vehicle 1301.

Comparing FIG. 13B and FIG. 13C described above, it is understood that the warning to the operator and the traveling control for the avoidance of a collision are preferentially performed for the vehicle that is performing work of lower priority. In other words, the execution of the processing described in this embodiment makes it possible to take measures for the avoidance of a collision according to the priority of work that each vehicle is performing. It is, hence, understood that this embodiment can reduce adverse effects on the overall productivity in amine or at a construction site.

As a determination algorithm for use in the determination of a risk of collision, a determination algorithm other than those which use a determination area such as those described above may be adopted. For example, the determination of a risk of collision can be conducted by calculating time-to-collision (TTC) based on the relative speed and relative distance of the another vehicle to the own vehicle, and determining whether the result of the calculation is not greater than a preset threshold. In this case, the determination algorithm for use in the determination of the risk of collision can be changed, for example, by varying the magnitude of the threshold according to the priorities of the own vehicle and another vehicle instead of varying the size of the determination area as described in this embodiment.

According to the above-described first embodiment of the present invention, the following advantageous effects can be brought about.

(1) The safe operation assistance device 101 as onboard terminal device includes the own vehicle information acquisition section 202, the vehicle-to-vehicle communication section 201, and the collision risk determination section 206. The own vehicle information acquisition section 202 acquires own vehicle information including position information of own vehicle. The vehicle-to-vehicle communication section 201 transmits the own vehicle information to another vehicle, and from the another vehicle, receives another vehicle information including position information of the another vehicle. The collision risk determination section 206 determines the risk of collision between the own vehicle and the another vehicle by using the predetermined determination algorithm. Based on the details of work that the own vehicle and the another vehicle are performing, respectively, the collision risk determination section 206 sets the priority of the own vehicle and that of the another vehicle, and based on the priority of the own vehicle and that of the another vehicle so set, changes the determination algorithm (step 704). Owing to the above-described configuration, the safe operation assistance device 101 can prevent a collision accident between vehicles themselves while reducing adverse effects on the overall productivity.

(2) The safe operation assistance device 101 further includes the work mode determination section 205, which based on the own vehicle information and other vehicle information managed at the own vehicle/other vehicle information management section 204, estimate the details of work that the own vehicle and another vehicle are performing, respectively. The own vehicle information and another vehicle information each further include at least one of the vehicle type 402, vehicle speed 405, traveling direction 406, vehicle direction 407 and vehicle status 408 representing information on the type, speed, traveling direction, direction and status of the own vehicle or another vehicle. Owing to the above-described configuration, the safe operation assistance device 101 can precisely estimate the details of work that the own vehicle and another vehicle are performing, respectively.

(3) The work mode determination section 205 estimates the details of work, which the own vehicle and another vehicle are performing, respectively, based on the fleet management statuses 409 representing fleet management information that in turn represent the statuses of fleet management of the own vehicle and another vehicle as transmitted from an outside and outputted from fleet management terminal 102 (steps 805 to 811, 901 to 910). Owing to the above-described configuration, the work mode determination section 205 can estimate still more precisely the details of work that the own vehicle and another vehicle are performing, respectively.

(4) The collision risk determination section 206 changes the determination algorithm by setting a determination area for determining a risk of collision between the own vehicle and the another vehicle (steps 1002,1003), and varying the size of the determination area based on the priority of the own vehicle and that of the another vehicle. Owing to the above-described configuration, the collision risk determination section 206 can adequately change the determination algorithm based on the priority of the own vehicle and that of the another vehicle.

Second Embodiment

Figure 14:
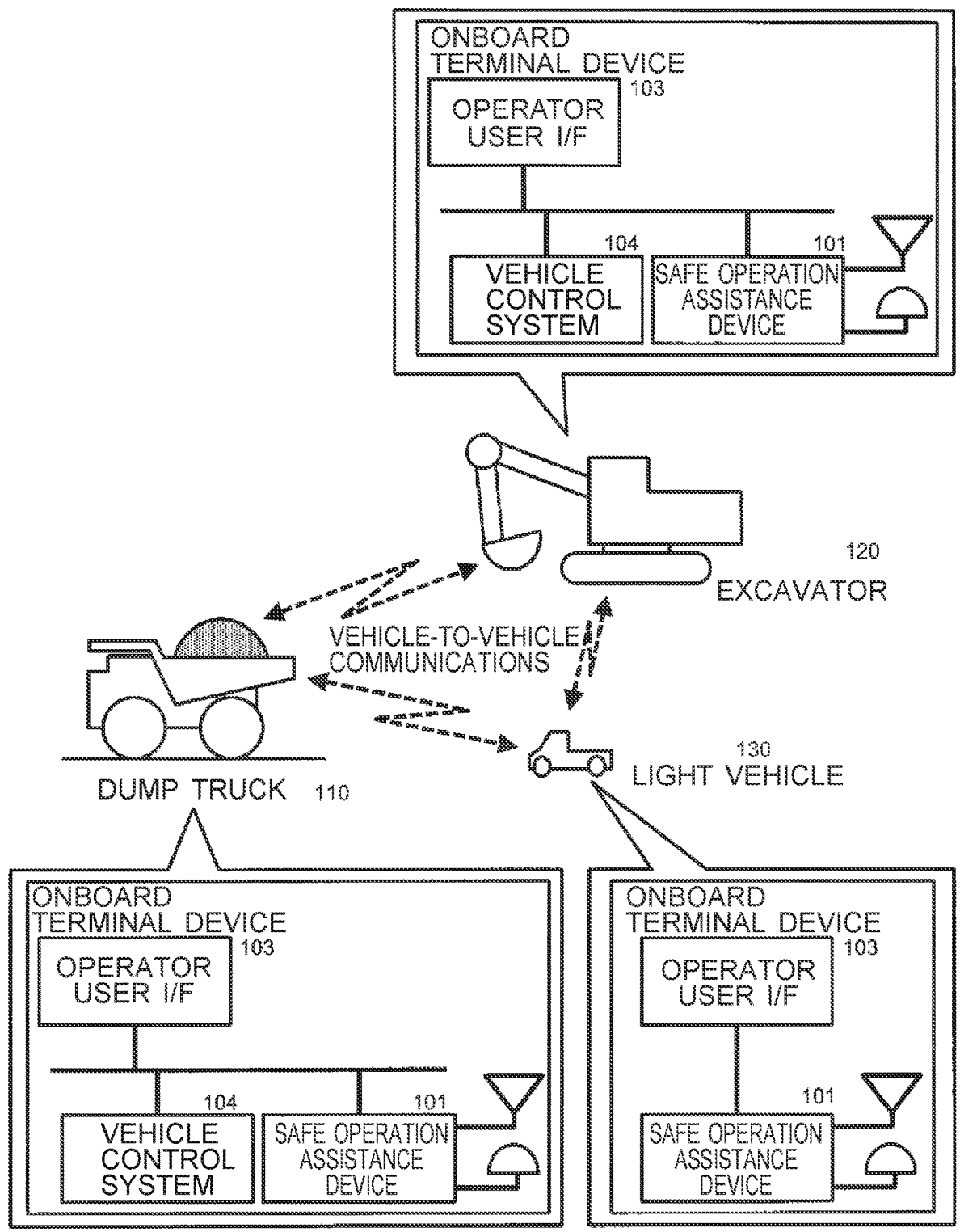
FIG. 14 is a diagram illustrating the configuration of a safe operation assistance system including safe operation assistance devices as application examples of onboard terminal device according to a second embodiment of the present invention.

FIG. 14 is a diagram illustrating the configuration of a safe operation assistance system including safe operation assistance devices as application examples of onboard terminal device according to a second embodiment of the present invention. Compared with the safe operation assistance system according to the first embodiment of the present invention as illustrated in FIG. 1, the safe operation assistance system illustrated in FIG. 14 is different in that the fleet management center 140 does not exist and the fleet management terminals 102 mounted on the vehicles 110,120, respectively, are not included.

In this embodiment, each work mode determination section 205 executes processing, which is different from the corresponding processing in the first embodiment, upon determining the details of work by the own vehicle and another vehicle in step 701 of FIG. 7. A description will hereinafter be made about work mode determination processing to be executed in this embodiment.

Figure 15:
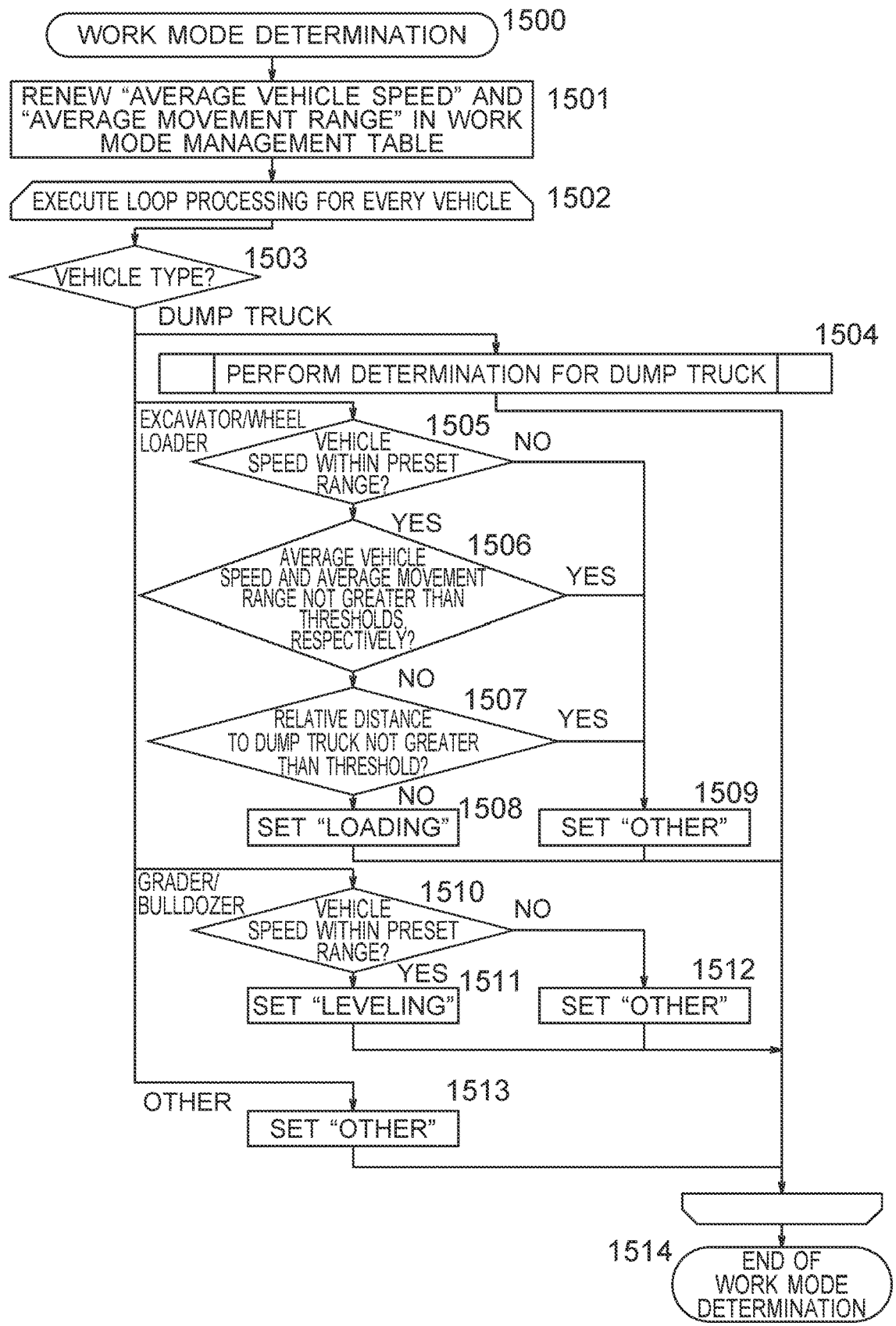
FIG. 15 is a flow chart of work mode determination processing in the second embodiment of the present invention.

FIG. 15 is a flow chart of work mode determination processing in the second embodiment of the present invention. In step 701 of FIG. 7, the work mode determination section 205 starts the execution of the work mode determination processing illustrated in FIG. 15 (step 1500).

In the work mode determination processing, the work mode determination section 205 first renews the values of the average vehicle speed 422 and average movement range 423 in the work mode management table 211 (step 1501) as in the first embodiment described with reference to FIG. 8.

After the renewal of the values of the average vehicle speed 422 and average movement range 423 in step 1501, the work mode determination section 205 executes, with respect to each vehicle the information of which is set in the work mode management table 211, loop processing to conduct the below-described processing of from step 1503 to step 1513 (step 1502). Upon completion of the execution of the loop processing with respect to all the vehicles, the work mode determination section 205 ends the work mode determination processing illustrated in the processing flow of FIG. 15 (step 1514).

In the loop processing, the work mode determination section 205 selects, as a processing target, one of the own vehicle and other vehicles as in the first embodiment described with reference to FIG. 8. Based on the details of the corresponding vehicle type 402 in the vehicle information management table 210, the work mode determination section 205 then determines the type of the selected vehicle (step 1503). As a result, the processing proceeds to step 1504 if the vehicle is a dump truck, to step 1505 if the vehicle is an excavator or wheel loader, or to step 1510 if the vehicle is a grader or bulldozer. Further, if the vehicle is not of any of the above-described vehicle types, for example, is a light vehicle or the like, the processing proceeds to step 1513.

If the processing has proceeded from step 1503 to step 1504, the work mode determination section 205 executes the determination of a work mode for the dump truck (step 1504). About the details of the determination of the work mode as conducted in this step 1504, a description will be made subsequently herein with reference to the processing flow of FIG. 16. After execution of the processing of step 1504, the work mode determination section 205 ends the loop processing for the vehicle.

If the processing has proceeded from step 1503 to step 1505, the work mode determination section 205 determines whether the speed of the vehicle is within a preset, predetermined range (step 1505). Described specifically, with reference to the value of the vehicle speed 405 in the row, which corresponds to the vehicle, of the vehicle information management table 210, the work mode determination section 205 acquires the speed of the vehicle. As a result, the processing proceeds to step 1506 if the speed of the vehicle is within the predetermined range, or to step 1509 if the speed of the vehicle is not within the predetermined range and the average vehicle speed 422 and average movement range 423 calculated using past histories of the own vehicle information and other vehicle information.

If the processing has proceeded from step 1505 to step 1506, the work mode determination section 205 determines whether the average vehicle speed and average movement range of the vehicle are not greater than preset, predetermined thresholds, respectively (step 1506). Described specifically, with reference to the values of the average vehicle speed 422 and average movement range 423 in the row, which corresponds to the vehicle, of the work mode management table 211, the work mode determination section 205 acquires the average vehicle speed and average movement range of the vehicle, which is the excavator or wheel loader. As a result, if the average vehicle speed and average movement range of the vehicle are both not greater than the preset, predetermined thresholds, respectively, the processing proceeds to step 1507. If at least one of the average vehicle speed and average movement range is not smaller than the corresponding threshold, the processing proceeds to step 1509.

If the processing has proceeded from step 1506 to step 1507, the work mode determination section 205 determines whether the relative distance of the vehicle to any dump truck is not greater than a preset, predetermined threshold (step 1507). Described specifically, the work mode determination section 205 searches for rows, in which the details of the vehicle type 402 are "dump truck", in the vehicle information management table 210. Based on the values of the latitude 403-1 and longitude 403-2 of the vehicle and the values of the latitude 403-1 and longitude 403-2 recorded in the row located by the search, the work mode determination section 205 computes the relative distance of the vehicle to each of the dump trucks. As a result, the processing proceeds to step 1508 if there is at least one row in which the computed relative distance is not greater than the preset threshold. If there is not any row in which the details of the vehicle type 402 are "dump truck" or if the computed relative distances are all not smaller than the threshold, on the other hand, the processing proceeds to step 1509.

If the processing has proceeded from step 1507 to step 1508, the work mode determination section 205 sets "loading" as the work mode of the vehicle (step 1508). Described specifically, the work mode determination section 205 sets "loading" as the details of the work mode 424 in the row, which corresponds to the vehicle, of the work mode management table 211. In addition, the work mode determination section 205 also similarly sets "loading" as the details of the work mode 411 in the row, which corresponds to the vehicle, of the vehicle information management table 210. After execution of the processing of step 1508, the work mode determination section 205 ends the loop processing for the vehicle.

If the processing has proceeded from step 1505, 1506 or 1507 to step 1509, the work mode determination section 205 sets "other" as the work mode of the vehicle (step 1509). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 1509, the work mode determination section 205 ends the loop processing for the vehicle.

If the processing has proceeded from step 1503 to step 1510, the work mode determination section 205 determines whether the speed of the vehicle is within the preset range (step 1510). Described specifically, with reference to the value of the vehicle speed 405 in the row, which corresponds to the vehicle, of the vehicle information management table 210, the work mode determination section 205 acquires the speed of the vehicle. As a result, the processing proceeds to step 1511 if the speed of the vehicle is within the preset range, or to step 1512 if the speed of the vehicle is not within the preset range.

If the processing has proceeded from step 1510 to step 1511, the work mode determination section 205 sets "leveling" as the work mode of the vehicle (step 1511). Described specifically, the work mode determination section 205 sets "leveling" as the details of the work mode 424 in the row, which corresponds to the vehicle, of the work mode management table 211. In addition, the work mode determination section 205 also similarly sets "leveling" as the details of the work mode 411 in the row, which corresponds to the vehicle, of the vehicle information management table 210. After execution of the processing of step 1511, the work mode determination section 205 ends the loop processing for the vehicle.

If the processing has proceeded from step 1510 to step 1512, the work mode determination section 205 sets "other" as the work mode of the vehicle (step 1512). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 1512, the work mode determination section 205 ends the loop processing for the vehicle.

If the processing has proceeded from step 1503 to step 1513, the work mode determination section 205 sets "other" as the work mode of the vehicle (step 1513). Described specifically, the work mode determination section 205 sets "other" as the details of the work mode 424 in the row, which corresponds to the vehicle, of the work mode management table 211. In addition, the work mode determination section 205 also similarly sets "other" as the details of the work mode 411 in the row, which corresponds to the vehicle, of the vehicle information management table 210. After execution of the processing of step 1513, the work mode determination section 205 ends the loop processing for the vehicle.

FIG. 16 is a flow chart of work mode determination for dump truck in the second embodiment of the present invention. In step 1504 of FIG. 15, the work mode determination section 205 starts the work mode determination for dump truck as illustrated in FIG. 16 (step 1600).

In the work mode determination for dump truck, the work mode determination section 205 first determines whether the relative distance between the vehicle and any excavator or wheel loader is not greater than the preset first threshold (step 1601). Described specifically, the work mode determination section 205 searches for any row, in which the details of the vehicle type 402 is "excavator" or "wheel loader", in the vehicle information management table 210. Based on the values of the latitude 403-1 and longitude 403-2 of the vehicle and the values of the latitude 403-1 and longitude 403-2 as recorded in each row located by the search, the work mode determination section 205 then computes the relative distance between the vehicle and the excavator or wheel loader. As a result, if there is at least one row in which the computed relative distance is not greater than the preset first threshold, the processing proceeds to step 1604. If there is not any row in which the details of the vehicle type 402 are "excavator" or "wheel loader" or if the computed relative distance or distances is or are not smaller than the first threshold, on the other hand, the processing proceeds to step 1602.

If the processing has proceeded from step 1601 to step 1602, the work mode determination section 205 finds out the status of the vehicle (step 1602). Described specifically, with reference to the vehicle status 408 in the row, which corresponds to the vehicle, of the vehicle information management table 210, the work mode determination section 205 determines what the status of the vehicle is. As a result, the processing proceeds to step 1605 if the status of the vehicle is "loading", but to step 1603 if the status of the vehicle is other than "loading".

If the processing has proceeded from step 1602 to step 1603, the work mode determination section 205 determines whether the relative distance between the vehicle and the excavator as computed in step 1601 is not greater than the second threshold preset beforehand as a value greater than the first threshold and the speed of the vehicle is not greater than the preset speed threshold (step 1603). As a result, if there is at least one row in which the computed relative distance is not greater than the preset second threshold and the speed of the vehicle is not greater than the preset speed threshold, the processing proceeds to step 1606. If there is not any row in which the details of the vehicle type 402 are "excavator" or "wheel loader", if the computed relative distance or distances is or are not smaller than the second threshold, or if the speed of the vehicle is not smaller than the preset speed threshold, on the other hand, the processing proceeds to step 1605.

If the processing has proceeded from step 1601 to step 1604, the work mode determination section 205 sets "loading" as the work mode of the vehicle (step 1604). Described specifically, the work mode determination section 205 sets "loading" as the details of the work mode 424 in the row, which corresponds to the vehicle, of the work mode management table 211. In addition, the work mode determination section 205 also similarly sets "loading" as the details of the work mode 411 in the row, which corresponds to the vehicle, of the vehicle information management table 210. After execution of the processing of step 1604, the work mode determination section 205 ends the work mode determination for the vehicle, i.e., the dump truck (step 1607).

If the processing has proceeded from step 1602 or 1603 to step 1605, the work mode determination section 205 sets "hauling" as the work mode of the vehicle (step 1605). Described specifically, the work mode determination section 205 sets "hauling" as the details of the work mode 424 in the row, which corresponds to the vehicle, of the work mode management table 211. In addition, the work mode determination section 205 also similarly sets "hauling" as the details of the work mode 411 in the row, which corresponds to the vehicle, of the vehicle information management table 210. After execution of the processing of step 1605, the work mode determination section 205 ends the work mode determination for the vehicle, i.e., the dump truck (step 1607).

If the processing has proceeded from step 1603 to step 1606, the work mode determination section 205 sets "waiting" as the work mode of the vehicle (step 1606). Described specifically, the work mode determination section 205 sets "waiting" as the details of the work mode 424 in the row, which corresponds to the vehicle, of the work mode management table 211. In addition, the work mode determination section 205 also similarly sets "waiting" as the details of the work mode 411 in the row, which corresponds to the vehicle, of the vehicle information management table 210. After execution of the processing of step 1606, the work mode determination section 205 ends the work mode determination for the vehicle, i.e., the dump truck (step 1607).

By executing the above-described processing of FIG. 15 and FIG. 16, the work mode determination section 205 can estimate the details of work, which the own vehicle and the other vehicles are performing, respectively, based on the own vehicle information and other vehicle information stored in the vehicle information management table 210 of the own and other vehicle information management section 204.

According to the above-described second embodiment of the present invention, advantageous effects similar to the advantageous effects (1), (2) and (4) described in connection with the first embodiment can be brought about. In addition, the following advantageous effects (5) can also be brought about in place of the advantageous effects (3).

(5) The work mode determination section 205 estimates the details of work, which the own and other vehicles are performing, respectively, based on the past histories of the own vehicle information and other vehicle information in addition to the own vehicle information and other vehicle information. Described specifically, based on the histories of past values of the vehicle speed 405, latitude 403-1, longitude 403-2 and altitude 403-3, the work mode determination section 205 computes the values of the average vehicle speeds 422 and average movement ranges 423 of the own vehicle and other vehicles (step 1501) and, if the own vehicle and other vehicles are each an excavator or wheel loader, estimates the details of their work based On the computed values (steps 1506,1508,1509). Owing to the above-described configuration, even if the fleet management information of the own vehicle and other vehicles is not available, the work mode determination section 205 can precisely estimate the details of work that the own vehicle and other vehicles are performing, respectively.

As has been described above, according to the present invention, it is possible to change the conditions, under which a warning is to be made for the avoidance of a collision, according to the priorities of work that individual vehicles are performing, respectively, and to preferentially make a warning to the vehicle that is performing work of low priority. Therefore, a collision between vehicles themselves can be avoided without stopping, as best as possible, work having large effects on the overall productivity.

The above-described individual embodiments and various modifications are merely illustrative, and the present invention shall not be limited to the details of these embodiments and modifications insofar as the characteristic features of the present invention are not lost. The present invention shall not be limited to the above-described embodiments and modifications, and various changes are possible within a range not departing from the spirit of the present invention.

The details disclosed in following application, on which Convention priority is claimed, are incorporated herein as a reference: Japanese Patent Application 2015-119094 (filed: 12 Jun. 2015).

LEGENDS

101 Safe operation assistance device
102 Fleet management terminal
103 Operator user I/F
104 Vehicle control system
110,120,130 Vehicle
140 Fleet management center
201 Vehicle-to-vehicle communication section
202 Own vehicle information acquisition section
203 Operator notification section
204 Own and other vehicle information management section
205 Work mode determination section
206 Collision risk determination section
207 Control signal generation section
210 Vehicle information control table
211 Work mode management table
212 Priority management table

The invention claimed is:

1. A safe operation assistance system mounted on each of a plurality of vehicles, comprising:
a communication device configured to perform vehicle-to-vehicle communication among the plurality of vehicles without going through any relay station;
a memory configured to store a vehicle information management table, a work mode management table, and a priority management table; and
a safe operation assistance controller,
wherein
the vehicle information management table is configured to hold a plurality of vehicle information including a vehicle identifier for identifying a vehicle, a type of the vehicle identified by the vehicle identifier, position information output from a GPS receiver mounted on the vehicle, and fleet management information output from a fleet management terminal,
the work mode management table is configured to hold the vehicle identifier and a latest work mode of the vehicle identified by the vehicle identifier, which are made to correspond to each other,
the priority management table is configured to hold a priority corresponding to a combination of the vehicle type and the work mode,
the safe operation assistance controller is configured to perform processing to:
read out a piece of the plurality of vehicle information including the vehicle identifier of an own vehicle and a piece of the plurality of vehicle information including the vehicle identifier of another vehicle from the vehicle information management table stored in the memory;
determine each work mode of each vehicle identifier based on the pieces of the plurality of vehicle information which have been read out;
update the work mode management table stored in the memory by each work mode of each vehicle identifier which has been determined;
read out the priority corresponding to a combination of the vehicle type and the work mode as updated for each of the own vehicle and the another vehicle from the priority management table stored in the memory; and
determine a risk of collision between the own vehicle and the another vehicle based on the priority of the own vehicle and the priority of the another vehicle which have been read out,
wherein the safe operation assistance controller is configured to perform the processing according to cycle set beforehand.

2. The safe operation assistance system according to claim 1, wherein
the safe operation assistance controller is further configured to perform processing to:
set a determination area for determining the risk of collision around the own vehicle indicated by the position information included in the vehicle information of the own vehicle and a determination area around the another vehicle indicated by the position information included in the vehicle information of the another vehicle;
when the priority of the own vehicle is higher than the priority of the another vehicle, cause a size of the determination area around the own vehicle or a size the determination area around the another vehicle to be small;
when the priority of the own vehicle is lower than the priority of the another vehicle, cause the size of the determination area around the own vehicle or the size the determination area around the another vehicle to be large;
when the determination area around the own vehicle and the determination area around the another vehicle overlap with each other, determine that there is the risk of collision; and
when it is determined that there is the risk of collision, issue a warning through a user interface.

3. A vehicle collision prevention method that is performed by each of a plurality of vehicles including a communication device configured to perform vehicle-to-vehicle communication among the plurality of vehicles without going through any relay station, and a memory configured to store a vehicle information management table, a work mode management table, and a priority management table,
wherein
the vehicle information management table is configured to hold a plurality of vehicle information including a vehicle identifier for identifying a vehicle, a type of the vehicle identified by the vehicle identifier, position information output from a GPS receiver mounted on the vehicle, and fleet management information output from a fleet management terminal,
the work mode management table is configured to hold the vehicle identifier and a latest work mode of the vehicle identified by the vehicle identifier, which are made to correspond to each other, the priority management table is configured to hold a priority corresponding to a combination of the vehicle type and the work mode, the vehicle collision prevention method comprises the steps of:

reading out a piece of the plurality of vehicle information including the vehicle identifier of an own vehicle and a piece of the plurality of vehicle information including the vehicle identifier of another vehicle from the vehicle information management table stored in the memory;

determining each work mode of each vehicle identifier based on the pieces of the plurality of vehicle information which have been read out;

updating the work mode management table stored in the memory by each work mode of each vehicle identifier which has been determined;

reading out the priority corresponding to a combination of the vehicle type and the work mode as updated for each of the own vehicle and the another vehicle from the priority management table stored in the memory; and determining a risk of collision between the own vehicle and the another vehicle based on the priority of the own vehicle and the priority of the another vehicle which have been read out; and performing the steps above according to a cycle set beforehand.

4. The vehicle collision prevention method according to claim 3, further comprising the steps of:

setting a determination area for determining the risk of collision around the own vehicle indicated by the position information included in the vehicle information of the own vehicle and a determination area around the another vehicle indicated by the position information included in the vehicle information of the another vehicle;

when the priority of the own vehicle is higher than the priority of the another vehicle, causing a size of the determination area around the own vehicle or a size the determination area around the another vehicle to be small;

when the priority of the own vehicle is lower than the priority of the another vehicle, causing the size of the determination area around the own vehicle or the size the determination area around the another vehicle to be large;

when the determination area around the own vehicle and the determination area around the another vehicle overlap with each other, determining that there is the risk of collision; and when it is determined that there is the risk of collision, issuing a warning through a user interface.

* * * * *